US005492947A

United States Patent [19]
Wood et al.

[11] Patent Number: 5,492,947
[45] Date of Patent: Feb. 20, 1996

[54] BARRIER MATERIAL COMPRISING A THERMOPLASTIC AND A COMPATIBLE CYCLODEXTRIN DERIVATIVE

[75] Inventors: Willard E. Wood, Arden Hills; Neil J. Beaverson, Hugo, both of Minn.

[73] Assignee: Aspen Research Corporation, New Brighton, Minn.

[21] Appl. No.: 264,771

[22] Filed: Jun. 23, 1994

[51] Int. Cl.$^6$ .................................. C08L 3/04; C08L 5/16
[52] U.S. Cl. ........................................................... 524/48
[58] Field of Search ................................................ 524/48

[56] References Cited

U.S. PATENT DOCUMENTS

| | | | |
|---|---|---|---|
| 3,472,835 | 10/1969 | Buckler et al. | 260/209 |
| 4,274,985 | 6/1981 | Szejtli et al. | 260/17.4 |
| 4,356,115 | 10/1982 | Shibanai et al. | 252/522 |
| 4,547,572 | 10/1985 | Fenyvesi et al. | 536/103 |
| 4,636,343 | 1/1987 | Shibanai | 264/118 |
| 4,677,177 | 6/1987 | Shibanai et al. | 527/300 |
| 4,681,934 | 7/1987 | Shibanai et al. | 536/46 |
| 4,711,936 | 12/1987 | Shibanai et al. | 525/485 |
| 4,722,815 | 2/1988 | Shibanai | 264/117 |
| 4,725,633 | 2/1988 | Shibanai | 523/220 |
| 4,725,657 | 2/1988 | Shibanai | 523/210 |
| 4,726,905 | 2/1988 | Friedman et al. | 210/692 |
| 4,727,064 | 2/1988 | Pitha | 514/58 |
| 4,728,510 | 3/1988 | Shibanai et al. | 424/94.5 |
| 4,732,759 | 3/1988 | Shibanai et al. | 424/94.61 |
| 4,738,923 | 4/1988 | Ammeraal | 435/97 |
| 4,769,242 | 9/1988 | Shibanai | 424/411 |
| 4,772,291 | 9/1988 | Shibanai et al. | 8/526 |
| 4,774,329 | 9/1988 | Friedman | 536/103 |
| 4,781,977 | 11/1988 | Yagi et al. | 428/332 |
| 4,808,232 | 2/1989 | Beesley | 127/46.3 |
| 4,840,679 | 6/1989 | Ammeraal et al. | 127/40 |
| 4,847,151 | 7/1989 | Shibanai | 428/389 |
| 4,851,394 | 7/1989 | Kubodera | 514/54 |
| 4,871,541 | 10/1989 | Shibanai | 424/411 |
| 4,902,788 | 2/1990 | Zemel et al. | 536/1.1 |
| 4,904,306 | 2/1990 | Ammeraal | 127/46.1 |

(List continued on next page.)

FOREIGN PATENT DOCUMENTS

| | | |
|---|---|---|
| 483380A1 | 5/1992 | European Pat. Off. . |
| 91-6849 | 6/1991 | France . |
| 2927733 | 1/1980 | Germany . |
| 87-3710569 | 3/1987 | Germany . |
| 3710569 | 5/1988 | Germany . |
| 50-64144 | 5/1975 | Japan . |
| 59-156531 | 7/1984 | Japan . |
| 59-260004 | 12/1984 | Japan . |
| 61-106348 | 5/1986 | Japan . |
| 61-103542 | 5/1986 | Japan . |
| 62-27162 | 2/1987 | Japan . |
| 62-98608 | 4/1987 | Japan . |
| 87-269030 | 10/1987 | Japan . |
| 62-263047 | 11/1987 | Japan . |
| 63-87925 | 4/1988 | Japan . |
| 63-218063 | 9/1988 | Japan . |
| 63-237932 | 10/1988 | Japan . |
| 63-265926 | 11/1988 | Japan . |
| 1-16618 | 1/1989 | Japan . |
| 1-167496 | 6/1989 | Japan . |
| 2-18703 | 1/1990 | Japan . |
| 2-18702 | 1/1990 | Japan . |
| 2-18706 | 1/1990 | Japan . |
| 2-18704 | 1/1990 | Japan . |
| 2-18705 | 1/1990 | Japan . |
| 2-254844 | 9/1990 | Japan . |
| 3-100065 | 4/1991 | Japan . |
| 0100065 | 4/1991 | Japan ..................... 524/48 |
| 3-133163 | 6/1991 | Japan . |
| 4-108523 | 4/1992 | Japan . |
| 0108523 | 4/1992 | Japan ..................... 524/48 |
| 6-181728 | 7/1994 | Japan . |
| 91-JP667 | 5/1991 | WIPO . |
| 91-JP1012 | 7/1991 | WIPO . |
| 0014888 | 7/1994 | WIPO ..................... 524/48 |

OTHER PUBLICATIONS

Barrier Polymers, Kirk–Othmer, Encyclopedia of Chemical Technology, Fourth Edition, vol. 3, pp. 931–962.

Chinodex® Cyclodextrins, Chinoin Pharmaceutical and Chemical Works Ltd. pp. 1–40.

"Formation of ultrathin films consisting of proteins or polysaccharides and syndiotactic–rich poly(vinyl alcohol) mixtures adsorbed at air–solution interface," K. Yamaura et al., *Colloid Polym. Sci.*, 268(10), 968–71. (Abstract).

"Data on Plastic Packaging Materials for Food," H. Sugawara (Akita Prefectural Fermentation Research Institute), *Konbatekku*, Apr. 1994, pp. 1–7. (Translation).

"Synthesis of Chemically Modified Cyclodextrins," Alan P. Croft et al., Tetrahedron Report Number 147, Department of Chemistry, Texas Tech University, Lubbock, TX 79409, U.S.A. (Oct. 4, 1982), pp. 1417–1474.

(List continued on next page.)

Primary Examiner—Peter A. Szekely
Attorney, Agent, or Firm—Merchant, Gould, Smith, Edell, Welter & Schmidt

[57] ABSTRACT

A barrier film composition can comprise a thermoplastic web comprising a thermoplastic polymer and a dispersed cyclodextrin composition having substituents that compatibilize the cyclodextrin in the film. The thermoplastic/cyclodextrin film obtains substantial barrier properties from the interaction between the substituted cyclodextrin in the film material with a permeant. The substituents on the cyclodextrin molecule causes the cyclodextrin to be dispersible and stable in the film material resulting in an extrudable thermoplastic. Such materials can be used as a single layer film material, a multilayer film material which can be coated or uncoated and can be used in structural materials wherein the thermoplastic is of substantial thickness resulting in structural stiffness. The cooperation between the cyclodextrin and the thermoplastic polymer provides barrier properties to a web wherein a permeant can be complexed or entrapped by the cyclodextrin compound and held within the film preventing the permeant from passing through the film into the interior of a film, an enclosure or container. The permeant can comprise a variety of well known materials such as moisture, aliphatic or aromatic hydrocarbons, monomer materials, off flavors, toxic compounds etc.

35 Claims, 3 Drawing Sheets

U.S. PATENT DOCUMENTS

| | | | |
|---|---|---|---|
| 4,904,307 | 2/1990 | Ammeraal | 127/63 |
| 4,906,488 | 3/1990 | Pera | 426/573 |
| 4,917,956 | 4/1990 | Rohrbach | 428/423.1 |
| 4,920,214 | 4/1990 | Friedman | 536/103 |
| 5,001,176 | 3/1991 | Nakazima | 524/48 |
| 5,007,966 | 4/1991 | Hedges et al. | 127/34 |
| 5,007,967 | 4/1991 | Ammeraal | 127/46.1 |
| 5,032,182 | 7/1991 | Ammeraal et al. | 127/63 |
| 5,063,251 | 11/1991 | Bergishagen | 521/84.1 |
| 5,098,793 | 3/1992 | Rohrbach et al. | 428/532 |
| 5,100,878 | 3/1992 | Geber | 514/58 |
| 5,139,687 | 8/1992 | Brogher et al. | 252/8.6 |
| 5,142,035 | 8/1992 | Lewis | 536/103 |
| 5,177,129 | 1/1993 | Bobo, Jr. | 524/48 |
| 5,178,946 | 1/1993 | Sato et al. | 428/412 |
| 5,183,809 | 2/1993 | Weisz et al. | 514/58 |
| 5,198,429 | 3/1993 | Konig et al. | 514/58 |
| 5,202,188 | 4/1993 | Bekele | 428/414 |
| 5,208,083 | 5/1993 | Freed | 428/36.7 |
| 5,208,316 | 5/1993 | Yoshinaga | 528/68 |
| 5,213,808 | 5/1993 | Bar-Shalom et al. | 424/473 |
| 5,223,311 | 6/1993 | Tsutsumi et al. | 427/388.1 |
| 5,223,346 | 6/1993 | Lu | 428/516 |
| 5,232,767 | 8/1993 | Hisazumi et al. | 428/213 |
| 5,241,059 | 8/1993 | Yoshinaga | 536/4.1 |
| 5,246,611 | 9/1993 | Trinh | 252/8.6 |
| 5,247,013 | 9/1993 | Shinoda et al. | 525/54.2 |
| 5,252,384 | 10/1993 | Bothe et al. | 428/212 |
| 5,254,394 | 10/1993 | Bothe et al. | 428/212 |
| 5,256,491 | 10/1993 | Ishida et al. | 428/500 |
| 5,258,414 | 11/1993 | Bergishagen | 521/84.1 |
| 5,262,444 | 11/1993 | Rusincovitch et al. | 521/50.5 |
| 5,266,387 | 11/1993 | Fujii et al. | 428/213 |
| 5,266,413 | 11/1993 | Mills et al. | 428/480 |
| 5,269,935 | 12/1993 | Clough et al. | 210/653 |
| 5,352,717 | 10/1994 | Bergishagen | 524/48 |

OTHER PUBLICATIONS

"Application of cyclodextrin to insecticides, fungicides and aromatic films," I. Shibanai et al., *Gosei Jushi*, 34(4), pp. 2–9. (Abstract).

"Dispersion of β–cyclodextrin inclusion compound in polyethylene and manufacture of its blown films," D. Xu et al., *Gaofenzi Cailiao Kexue Yu Gongcheng*, 7(6), pp. 39–43. (Abstract).

"β–Cyclodextrin Matrix Films for Colon–Specific Drug Delivery," v. Siefke et al., *Proceed. Intern. Symp. Control. Rel. Bioact. Mater.*, 20 (1993), Controlled Release Society, Inc., pp. 182–184.

"Use of CDS in Plastics & Paper," *Cyclodextrin News*, vol. 3, No. 7 (Mar. 1989).

"Practical Application of Cyclodextrine to the Production of Insecticide, Mold Control and Fragrant Plastic Films," I. Shibanai et al., Japan Liquid Crystal. Co., Ltd.

"Polymer Inclusion Compounds by Polymerization of Monomers in β–Cyclodextrin Matrix in DMF Solution," M. Maciejewski et al., *J. Macromol. Sci.–Chem.*, A13(1), pp. 87–109 (1979).

"The thin film of fluroine–containing polymer having cyclodextrin prepared by Langmuir–Blodgett technique," M. Tamura et al., *Chem. Lett.*, (7), 1313–16. (Abstract).

"Surface–active properties of β–lactoglobulin: adsorption and rearrangement of glycosylated derivatives in surface films," Ralph D. Waniska et al., *J. Colloid Interface Sci.*, 117(1), pp. 251–257. (Abstract).

"Preparation and properties of insoluble films of cyclodextrin condensation polymers," W. Kutner et al., *J. Inclusion Phenom. Mol. Recognit. Chem.*, 13(3), pp. 257–265.

"Basic Concepts of Permeation Processes," *Recent Developments in Separation Science*, pp. 107–155.

"Permeability Coefficients," H. Yasuda, et al., pp. 229–240.

"Permeation, Diffusion, and Sorption of Gases and Vapors," R. M. Felder et al., *Methods of Experimental Physics*, vol. 16c, Copyright 1980 by Academic Press, Inc.

"Chapter 1 The Simple Transport Laws," *Diffusion and Sorption Fibers and Films*, pp. 3–11.

"Chapter 14 Convective Diffusion to a Solid Surface," *Diffusion and Sorption in Fibers and Films*, pp. 172–192.

"Fundamentals of gas permeation," D. L. MacLean et al., *Hydrocarbon Processing*, Aug. 1983.

"Solubility of Gases in Polyethylene," A. S. Michaels et al., *Journal of Polymer Science*, vol. L, pp. 393–412 (1961).

"Sorption and Flow of Gases in Polyethylene," A. S. Michaels et al., *Journal of Polymer Science*, vol. XLI, pp. 53–71 (1959).

"Analysis of Transient Sorption and Permeation of Small Molecules in Multiphase Polymer Systems," J. M. Ottino et al., *Polymer Engineering and Sciences*, vol. 24, No. 2, pp. 153–161 (1984).

"Mechanical Properties and Permeability of Polypropylene and Poly(ethylene terephthalate) Mixtures," P. Bataille et al., *Polymer Engineering and Science*, vol. 27, No. 9 (1987).

"Permeation of Pure Gases under Pressure through Asymmetric Porous Membranes. Membrane Characterization and Prediction of Performance," R. Rangarajan et al., *Ind. Eng. Chem. Process Des. Dev.*, vol. 23, No. 1 (1984), pp. 79–87.

"Integrated Forms of Simple Rate Expressions," pp. 17–19. *Polymer Handbook*, J. Brandrup et al. Interscience Publishers.

"Trends in Barrier Design," *Packaging*, May 1991, pp. 30–38.

"Barrier Packaging Technologies—What are the Alternatives?", Ronald H. Foster, Session 5 Design for Plastics Packaging.

"Minimizing Plastic Package/Product Interactions—An Unfilled Need," John D. Culter, *Journal of Plastic Film & Sheeting*, vol. 8, Jul. 1992, pp. 208–226.

"Interaction Between Packaging Materials and Foods," Chaim H. Mannheim et al., *Packaging Technology and Science*, vol. 3, pp. 127–132 (1990).

"Packaging for Flavour Retention and Protection from Odours," W. Guise, *Packaging*, Aug. 1992, pp. 9–13.

"The Odour Barrier Performance of Packaging Films," M. G. R. Zobel, *Packaging*, Dec. 1986, pp. 22–25.

"Barrier Media," J. Rellmann et al., *Kunststoffe German Plastics*, 82 (1992), pp. 3–9.

"Recycled Polymers in Food Packaging: Migration Considerations," Timothy H. Begley et al., *Food Technology*, Nov. 1993, pp. 109–112.

"Migration of plasticizers from printing inks into foods," Laurence Castle et al., *Food Additives and Contaminants*, vol. 6, No. 4 (1989) pp. 437–443.

"Method for Evaluating Package–Related Flavors," Lisa J. Thompson et al., *Food Technology*, Jan. 1994, pp. 90–94.

"Off–flavours' in foods, a summary of experience: 1948–74," N. Goldenberg, et al., *Chemistry and Industry*, 5 Jul. 1975, pp. 551–557.

"Organoleptic and Migrational Properties of PP Films Produced with Various Amounts of Scrap," F. Lox et al., *Packaging Technology and Science*, vol. 5, pp. 307–312 (1992).

"Nylon Film in Food Packaging," *Paper, Film & Foil*

*Converter*, p. 62.

"Optimizing the Value and Benefits of Packaging Films," R. Marsili, *Food Product Design*, Nov. 1993, pp. 63–75.

"Materials," *Modern Plastics International*, Jul. 1992, p. 50.

"Chapter 1 An Overview of Food and Food Packaging Interactions," Joseph H. Hotchkiss, *American Chemical Society*, 1988, pp. 1–10.

"Chapter 2 Transport of Apple Aromas in Polymer Films," P. T. DeLassus et al., *American Chemical Society*, 1988, pp. 11–27.

"Chapter 4 Permeation of High–Barrier Films by Ethyl Esters," J. Landois–Garza et al., *American Chemical Society*, 1988.

Dimensions of cyclodextrins

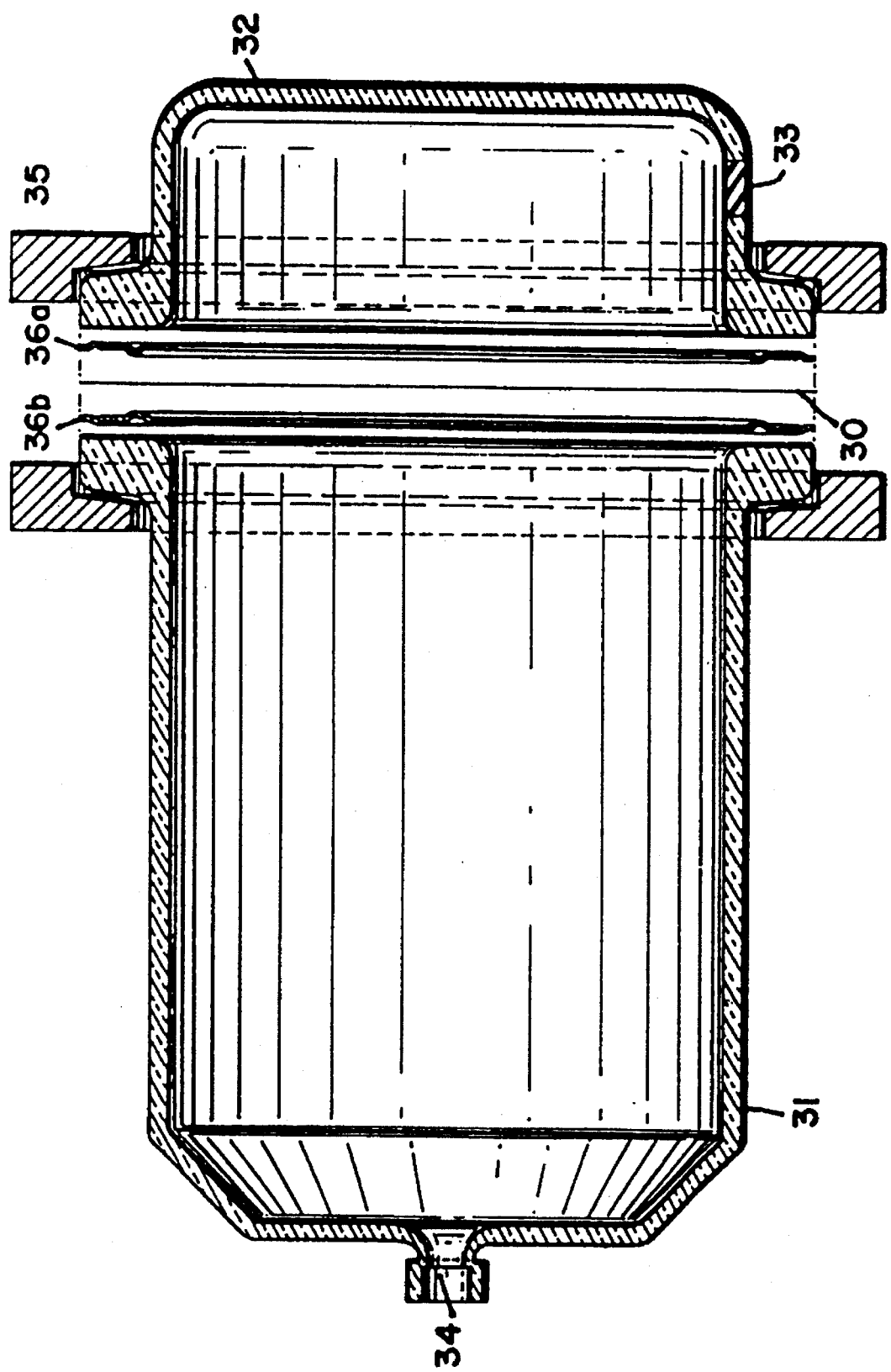

BARRIER MATERIAL COMPRISING A THERMOPLASTIC AND A COMPATIBLE CYCLODEXTRIN DERIVATIVE

FIELD OF THE INVENTION

The invention relates to thermoplastic polymeric compositions used as packaging materials with barrier properties. The thermoplastic barrier material can take the form of a barrier coating, a flexible film, a semirigid or rigid sheet or a rigid structure. The thermoplastic barrier materials can also take the form of a coating manufactured from an aqueous or solvent based solution or suspension of thermoplastic film forming components containing as one component, the barrier forming materials. Such a film sheet or coating material can act as a barrier to a variety of permeants including water vapor; organics such as aliphatic and aromatic hydrocarbons, aliphatic and aromatic halides, heterocyclic hydrocarbons, alcohols, aldehydes, amines, carboxylic acids, ketones, ethers, esters, sulfides, thiols, monomers, etc.; off flavors and off odors, etc. The thermoplastic barrier compositions of the invention can be extruded, laminated or molded into a variety of useful films, sheets, structures or shapes using conventional processing technology. Further, the monolayer, bilayer or multilayer films can be coated, printed or embossed.

BACKGROUND OF THE INVENTION

Much attention has been directed to the development of packaging materials in a film, a semi-rigid or rigid sheet and a rigid container made of a thermoplastic composition. In such applications, the polymeric composition preferably acts as a barrier to the passage of a variety of permeant compositions to prevent contact between ,e.g., the contents of a package and the permeant. Improving barrier properties is an important goal for manufacturers of film and thermoplastic resins.

Barrier properties arise from both the structure and the composition of the material. The order of the structure (i.e.,), the crystallinity or the amorphous nature of the material, the existence of layers or coatings can affect barrier properties. The barrier property of many materials can be increased by using liquid crystal or self-ordering molecular technology, by axially orienting materials such as an ethylene vinyl alcohol film, or by biaxially orienting nylon films and by using other useful structures. Internal polymeric structure can be crystallized or ordered in a way to increase the resistance to permeation of a permeant. A material can be selected, for the thermoplastic or packaging coating, which prevents absorption of a permeant onto the barrier surface. The material can also be selected to prevent the transport of the permeant through the barrier. Permeation that corresponds to Fick's law and non-Fickian diffusion has been observed. Generally, permeation is concentration and temperature dependent regarding mode of transport.

The permeation process can be described as a multistep event. First, collision of the permeant molecule with the polymer is followed by sorption into the polymer. Next, migration through the polymer matrix by random hops occurs and finally the desorption of the penetrant from the polymer completes the process. The process occurs to eliminate an existing chemical concentration difference between the outside of the film and the inside of the package. Permeability of an organic molecule through a packaging film consists of two component parts, the diffusion rate and solubility of the molecule in the film. The diffusion rate measures how fast molecule transport occurs through the film. It affects the ease with which a permeant molecule moves within a polymer. Solubility is a measure of the concentration of the permeant molecule that will be in position to migrate through the film. Diffusion and solubility are important measurements of a barrier film's performance. There are two types of mechanisms of mass transfer for organic vapors permeating through packaging films: capillary flow and activated diffusion. Capillary flow involves small molecules permeating through pinholes or highly porous media. This is of course an undesirable feature in a high barrier film. The second, called activated diffusion, consists of solubilization of the penetrants into an effectively non-porous film at the inflow surface, diffusion through the film under a concentration gradient (high concentration to low concentration), and release from the outflow surface at a lower concentration. In non-porous polymeric films, therefore, the mass transport of a penetrant includes three steps - sorption, diffusion, and desorption. Sorption and desorption depend upon the solubility of the penetrant in the film. The process of sorption of a vapor by a polymer can be considered to involve two stages: condensation of the vapor onto the polymer followed by solution of the condensed vapor into the polymer. For a thin-film polymer, permeation is the flow of a substance through a film under a permeant concentration gradient. The driving force for permeation is given as the pressure difference of the permeant across the film. Several factors determine the ability of a permeant molecule to permeate through a membrane: size, shape, and chemical nature of the permeant, physical and chemical properties of the polymer, and interactions between the permeant and the polymer.

A permeant for this application means a material that can exist in the atmosphere at a substantial detectable concentration and can be transmitted through a known polymer material. A large variety of permeants are known. Such permeants include water vapor, aromatic and aliphatic hydrocarbons, monomer compositions and residues, off odors, off flavors, perfumes, smoke, pesticides, toxic materials, etc. A typical barrier material comprises a single layer of polymer, a two layer coextruded or laminated polymer film, a coated monolayer, bilayer or multilayer film having one or more coatings on a surface or both surfaces of the film or sheet.

The two most widely used barrier polymers for food packaging are ethylene-vinyl alcohol copolymers (EVOH) ethylene vinyl acetate copolymers (EVA) and polyvinylidene chloride (PVDC). Other useful thermoplastics include ethylene acrylic materials including ethylene acrylic acid, ethylene methacrylic acid, etc. Such polymers are available commercially and offer some resistance to permeation of gases, flavors, aromas, solvents and most chemicals. PVDC is also an excellent barrier to moisture while EVOH offers very good processability and permits substantial use of regrind materials. EVOH copolymer resins are commonly used in a wide variety of grades having varying ethylene concentrations. As the ethylene content is reduced, the barrier properties to gases, flavors and solvents increase. EVOH resins are commonly used in coextrusions with polyolefins, nylon or polyethylene terephthalate (PET) as a structural layer. Commercially, amorphous nylon resins are being promoted for monolayer bottles and films. Moderate barrier polymer materials such as monolayer polyethylene terephthalate, polymethyl pentene or polyvinyl chloride films are available.

Substantial attention is now directed to a variety of technologies for the improvement of barrier properties. The use of both physical barriers and active chemical barriers or traps in packaging materials are under active investigation. In particular, attention has focused on use of specific copolymer and terpolymer materials, the use of specific polymer alloys, the use of improved coatings for barrier material such as silica metals, organometallics, and other strategies.

Another important barrier technology involves the use of oxygen absorbers or scavengers that are used in polymeric coatings or in bulk polymer materials. Metallic reducing agents such as ferrous compounds, powdered oxide or metallic platinum can be incorporated into barrier systems. These systems scavenge oxygen by converting it into a stable oxide within the film. Non-metallic oxygen scavengers have also been developed and are intended to alleviate problems associated with metal or metallic tastes or odors. Such systems include compounds including ascorbic acid (vitamin C) and salts. A recent introduction involves organometallic molecules that have a natural affinity for oxygen. Such molecules absorb oxygen molecules into the interior polymer chemical structure removing oxygen from the internal or enclosed space of packaging materials.

Packaging scientists are continuing to develop new polymeric films, coated films, polymeric alloys, etc. using blends of materials to attain higher barrier properties. Many of these systems have attained some degree of utility but have failed to achieve substantial commercial success due to a variety of factors including obtaining barrier performance at low cost.

One problem that arises when searching for polymer blends or compounded polymeric materials, relates to the physical properties of the film. Films must retain substantial clarity, tensile strength, resistance to penetration, tear resistance, etc. to remain useful in packaging materials. Blending unlike materials into a thermoplastic before film extrusion often results in a substantial reduction of film properties. Finding compatible polymer materials for polymer alloys, and compatible additives for polymeric materials typically require empirical demonstration of compatibility and does not follow a clearly developed theory. However compatibility can be demonstrated by showing that the compounded material obtains an improved barrier quality with little reduction in clarity, processability, or structural properties using conventional test methods. Accordingly, a substantial need exists for development of materials that can be incorporated into polymeric material to form a packaging thermoplastic having excellent barrier properties without any substantial reduction in structural properties.

BRIEF DISSCUSSION OF THE INVENTION

I have found that the barrier properties of a thermoplastic polymer can be improved, without any important reduction in clarity, processability or structural properties, by forming a barrier layer with a dispersed compatible cyclodextrin derivative in the polymer. I have developed two embodiments. The first comprises a barrier made using the thermoplastic technology containing the cyclodextrin derivative. The second, a coating made by casting a solution or suspension of a film forming polymer or polymer forming material combined with the cyclodextrin derivative to form a barrier layer. The cyclodextrin molecule without a compatible substituent group is not sufficiently compatible in the bulk material to result in a clear useful barrier layer or packaging material. The compatible cyclodextrin derivative is a compound substantially free of an inclusion complex. For this invention the term "substantially free of an inclusion complex" means that the quantity of the dispersed cyclodextrin derivative in the film contains a large fraction having cyclodextrin rings free of a permeant in the interior of the cyclodextrin molecule. The cyclodextrin compound will be added without complex, but some complexing can occur during manufacture from polymer degradation or from inks or coatings components. The internal cavity of the cyclodextrin remains unoccupied by any complexed molecule.

The cyclodextrin derivative has a substituent group bonded to the cyclodextrin molecule that is compatible with the polymeric material. Cyclodextrin is a cyclic dextran molecule having six or more glucose moieties in the molecule. The cyclodextrin derivative can contain at least one substituent on a cyclodextrin primary carbon atom. Preferably, the cyclodextrin is an α-cyclodextrin (αCD), a β-cyclodextrin (βCD), a γ-cyclodextrin (γCD) or mixtures thereof. We have found that the derivatization of the cyclodextrin molecule is essential for forming a cyclodextrin material that can be effectively blended into the thermoplastic bulk polymer material with no loss in clarity, processability or structural or packaging properties. The substituents on the cyclodextrin molecule are selected to possess a composition, structure and polarity to match that of the polymer to ensure that the cyclodextrin is sufficiently compatible in the polymer material. Further, a derivatized cyclodextrin is selected that can be blended into the thermoplastic polymer, formed into film, semirigid or rigid sheet or other rigid structural materials using conventional thermoplastic manufacturing techniques. Lastly, we have found that the cyclodextrin material can be used in forming such thermoplastic barrier structures without any substantial reduction in structural properties.

The film can provide a trap or barrier to contaminant materials from the polymer matrix and from the product storage and use environment. Thermoplastic polymers used in manufacturing packaging film materials are typically products made by polymerizing monomers resulting from refinery processes. Any refinery stream used in polymerization chemistry, contains residual monomer, trace level refinery hydrocarbons, catalyst and catalyst byproducts as impurities in the polymer matrix. Further, the environment in which materials are packaged after production, stored and used, often contain substantial proportions of contaminants that can permeate through a barrier film or sheet and can contaminate food or other packaged items. Residual polymer volatiles are complexed by dispersing cyclodextrin into molten film polymer using an extruder. The residents time or mixing time of CD(cyclodextrin) and molten polymer in the barrel of the extruder initiates the complexation of residual polymer volatiles. With environmental contaminants diffusing through the polymer, uncomplexed cyclodextrin dispersed in the polymer is believed to reside, not only between the polymer molecule chains, but in vaguely defined cavities between the polymer chains. As the permeant diffuses through the polymer on a tortuous path, the uncomplexed cyclodextrin is available to complex permeant molecules as they diffuse through the film. Some continual complexation and release of the same guest between cyclodextrin molecules in the film is possible. In other words, the cyclodextrin dispersed in the film is complexing and releasing. The diffusion rate may increase due to the number and size of the cavities caused by the presence of cyclodextrin. The modified cyclodextrin preferably has chemical properties that are compatible with the polymer and are of a size and shape that does not adversely affect the film's barrier property.

The beneficial effect of cyclodextrin over other highbarrier film technologies is twofold. First, cyclodextrin has the ability to complex residual organic volatile contaminants inherent in all polyethylene and polypropylene packaging films. Secondly, cyclodextrin offers the unique ability to complex permeants that may otherwise diffuse through the package film-improving product quality and safety. The barrier films of the invention can contain an effective amount of a permeant absorbing cyclodextrin which can be present at a concentration of about 0.1 to 5 wt %, preferably, 0.1 to 2 wt %, most preferably 0.5 to 2 wt %.

Since all packaging films are permeable to organic vapors, measuring the amount that permeates through the film over time is an important performance measurement of a particular packaging film. The permeation process described above is fast for low-water-activity packaged food products (crackers, cookies, cereals). The process of permeation can be faster or slower depending on the relative humidity outside the package and the product's storage temperature. As the relative humidity outside the package increase, the pressure differential between the outside and inside the package is greater. The greater the differential and/or the higher the temperature, the faster the organic permeants will diffuse through the film. The method used to test the film samples in this research used the worst case (60% relative humidity outside the package and 0.25 water activity inside the package) shelf-life storage conditions to accelerate the outcome of the testing. The organic permeant concentration used has been obtained from food products contaminated by inks used in printing on packaging materials, adhesive systems used in polymer or paper or foil laminations, or numerous environmental contaminants originating from gasoline, diesel fuel, paint solvent, cleaning materials, product fragrance, food products, etc. The relative humidity, water activity and permeant concentration have been used to test numerous high-barrier films presently used in the industry today. The testing has effectively demonstrated performance differences between various high-barrier films. Four test parameters are important in the performance of the high barrier film. First is the time it takes the permeant to begin diffusing through the package wall known as "lag-time", second, the rate the permeant diffuses through the film, third, the total amount of permeant that can pass through the film over a given time, and fourth, the effectiveness of the barrier to the permeant challenge.

FIG. 3 is a diagram of a test device used in measuring the permeability of the films of the inventions.

Figure 1A:
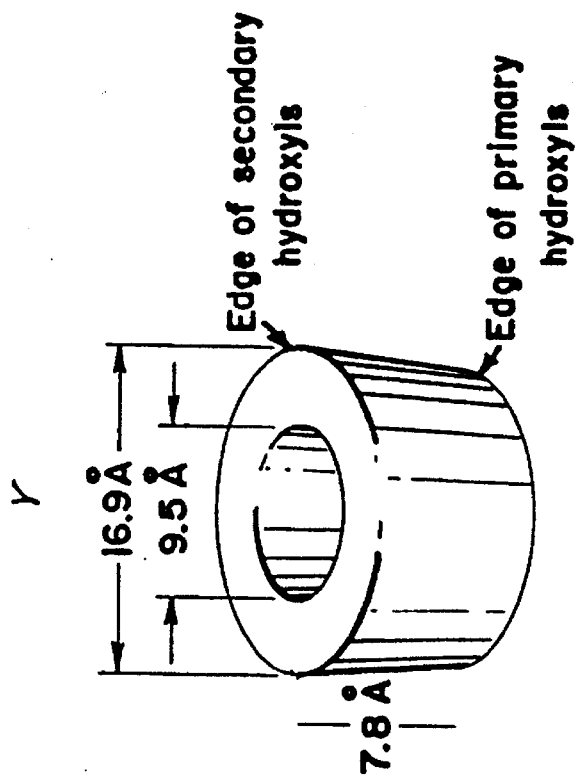
FIG. 1 is a graphical representation of the dimensions of the cyclodextrin molecule without derivatization. The α, β and γ cyclodextrins are shown.

We have also found that inclusion of the cyclodextrin derivatives in the thermoplastic materials of the invention can improve other properties of the film such as surface tension, static charge properties and other properties that improve the adaptability of this barrier material to coating and printing. The cyclodextrin derivative materials can be included in a variety of a thermoplastic film and sheet.

DETAILED DESCRIPTION OF THE INVENTION

Film

A film or a sheet is a flat unsupported section of a thermoplastic resin whose thickness is much smaller than its width or length. Films are generally regarded as being 0.25 millimeters (mm) or less, typically 0.01 to 20 mm thick. Sheet may range from about 0.25 mm to several centimeters (cm), typically 0.3 to 3 mm in thickness. Film or sheet can be used alone or in combination with other sheet, fabric or structural units through lamination, coextrusion or coating. For the invention the term "web" includes film, sheet, semi-rigid and rigid sheet and formed rigid units. Important properties include tensile strength, elongation, stiffness, tear strength and resistance; optical properties including haze, transparency; chemical resistance such as water absorption and transmission of a variety of permeant materials including water vapor and other permeants; electrical properties such as dielectric constant; and permanence properties including shrinkage, cracking, weatherability, etc.

Thermoplastic materials can be formed into barrier film using a variety of processes including blown thermoplastic extrusion, linear biaxially oriented film extrusion and by casting from molten thermoplastic resin, monomer or polymer (aqueous or organic solvent) dispersion. These methods are well known manufacturing procedures. The characteristics in the polymer thermoplastics that lead to successful barrier film formation are as follows. Skilled artisans manufacturing thermoplastic polymers have learned to tailor the polymer material for thermoplastic processing and particular end use application by controlling molecular weight (the melt index has been selected by the thermoplastic industry as a measure of molecular weight—melt index is inversely proportional to molecular weight, density and crystallinity). For blown thermoplastic extrusion polyolefins ("poly alpha-olefin such as, LDPE (low density polyethylene)", "LLDPE (linear low desnity polyethylene)", "HDPE (high density polyethylene)" are the most frequently used thermoplastic polymers, although polypropylene, nylon, nitriles, PETG (polyethylene terephthalate) and polycarbonate sometimes used to make blown film. Polyolefins typically have a melt index from 0.1 to 4 and preferably from 0.2 to 3 grams/10 mins., a density of about 0.910 to about 0.940 grams/cc, and a molecular weight, greater than 200,000, preferably greater than 250,000 and a molecular weight that can range from about 200,000 to 500,000. For biaxially oriented film extrusion the polymer most often used are olefin based—chiefly polyethylene and polypropylene (melt index from about 0.1 to 4, preferably about 0.4 to 4 grams/10 mins. and an $M_w$ (weight average molecular weight) of about 200,000 to 600,000). Polyesters and nylons can also be used. For casting, molten thermoplastic resin or monomer dispersion are typically produced from polyethylene or polypropylene. Occasionally, nylon, polyester and PVC(polyvinylchloride) are cast. For roll coating of aqueous based acrylic urethane and PVDC (polyvinylidene chloride, etc. dispersions are polymerized to an optimum crystallinity and molecular weight before coating.

A variety of thermoplastic materials are used in making film and sheet products. Such materials include poly(acrylonitrile-co-butadiene-co-styrene) polymers, acrylic polymers such as the polymethylmethacrylate, poly-n-butyl acrylate, poly(ethylene-co-acrylic acid), poly(ethylene-co-methacrylate), etc.; cellophane, cellulosics including cellulose acetate, cellulose acetate propionate, cellulose acetate butyrate and cellulose triacetate, etc.; fluoropolymers including polytetrafluoroethylene (teflon), poly(ethylene-co-tetrafluoroethylene) copolymers, (tetrafluoroethylene-co-propylene) copolymers, polyvinyl fluoride polymers, etc., polyamides such as nylon 6, nylon 6,6, etc.; polycarbonates; polyesters such as poly(ethylene-co-terephthalate), poly(ethylene-co-1,4-naphthalene dicarboxylate), poly(butylene-co-terephthalate); polyimide materials; polyethylene materials including low density polyethylene; linear low density polyethylene, high density polyethylene, high molecular weight high density polyethylene, etc.; polypropylene, biaxially oriented polypropylene; polystyrene, biaxially oriented polystyrene; vinyl films including polyvinyl chloride, (vinyl chloride-co-vinyl acetate) copolymers, polyvinylidene chloride, polyvinyl alcohol, (vinyl chloride-co-vinylidene dichloride) copolymers, specialty films including polysulfone, polyphenylene sulfide, polyphenylene oxide, liquid crystal polyesters, polyether ketones, polyvinylbutyral, etc.

Film and sheet materials are commonly manufactured using thermoplastic techniques including melt extrusion, calendaring, solution casting, and chemical regeneration processes. In many manufacturing steps an axial or a biaxial orientation step is used. The majority of film and sheet manufactured using melt extrusion techniques. In melt extrusion, the material is heated above its melting point in an extruder typically having an introduction section 27, a melt region 28 and an extruder section 29. The melt is introduced to a slot die resulting in a thin flat profile that is rapidly quenched to solid state and oriented. Typically the hot polymer film after extrusion is rapidly chilled on a roll or drum or using an air stream. Ultimately, a quenching bath can be used. Thermoplastic materials can also be blown. The hot melt polymer is extruded in FIG. 2 in an annular die 22 in a tube form 21. The tube is inflated with air (see air inlet 26) to a diameter determined by the desired film properties and by practical handling considerations. As the hot melt polymer emerges from the annular die, the extruded hot tube is expanded by air to 1.2 or four (4) times its initial die diameter. At the same time the cooling air (see air flow 20) chills the web forming a solid extruded with a hollow circular cross section 21. The film tube is collapsed within a V-shaped frame 23 and is nipped at the end of the frame (nip rolls 24) to trap air within the thus formed bubble. Rolls 24 and 25 draw the film from the die maintaining a continuous production of the extruded tube.

Figure 2:
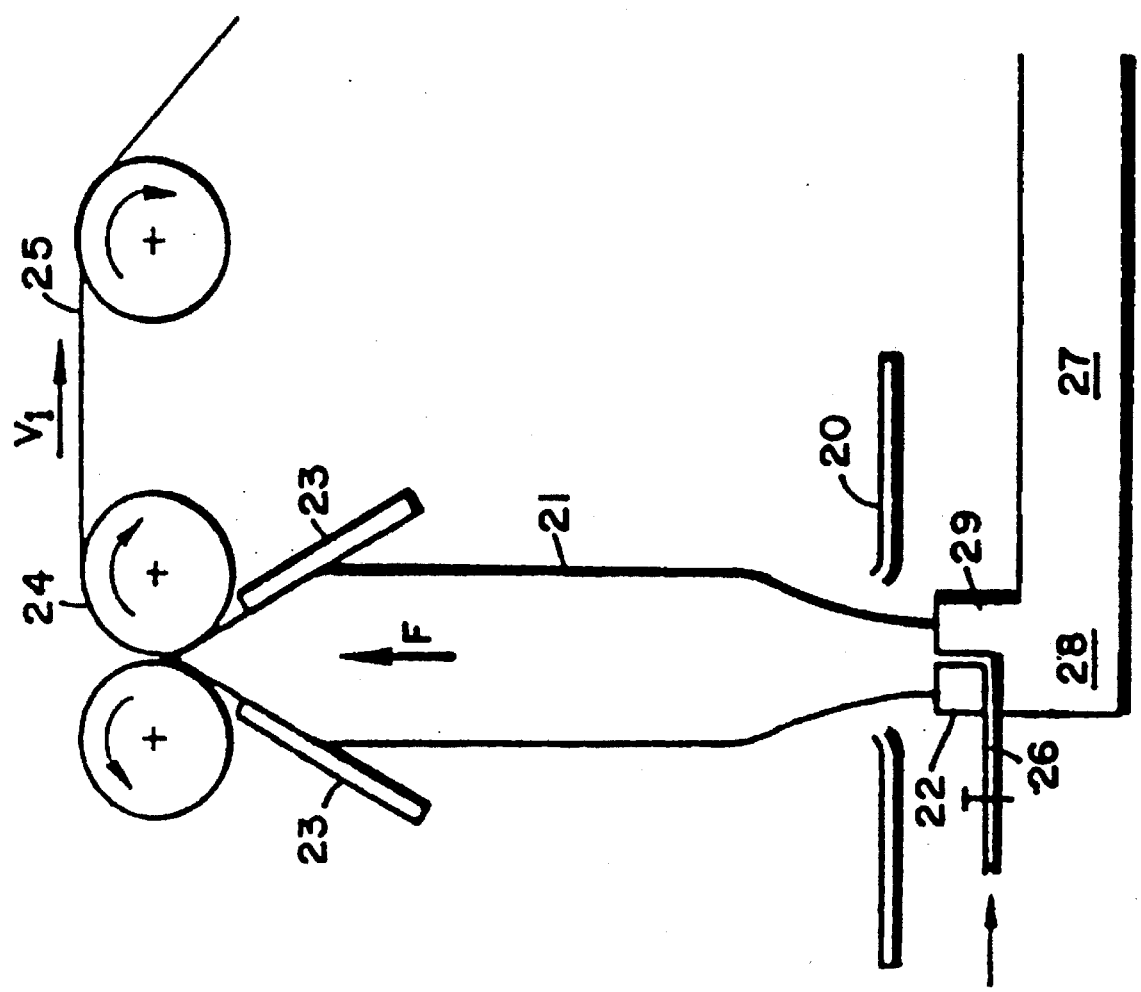
FIG. 2 is a schematic diagram of the extruder used to form the films set forth in Table I.

We have found that in the preparation of biaxially oriented film and in the production of blown thermoplastic film that the melt temperature and the die temperature are important in obtaining the permeability or permeant transmission rates preferred for films of the invention, to reduce melt fracture and to improve film uniformity (reduce surface defects). Referring to FIG. 2, the temperature of the melt at the melt region 28 should range from about 390°–420° F., preferably 395°–415° F. The temperature of the extrusion die 29 should range from about 400°–435° F., preferably 410°–430° F. The extruded polymer can be cooled using ambient water baths or ambient air. The extruder can be operated at through put such that production rates can be maintained but the polymer can be sufficiently heated to achieve the melt and die temperatures required. Production of the films of the invention at these temperatures ensures that the cyclodextrin material is fully compatible in the thermoplastic melt, is not degraded by the high temperatures and a clear compatible useful barrier film is produced.

Often two thermoplastic materials are joined in a coextrusion process to produce tailored film or sheet products adapted to a particular end use. One or more polymer types in two or more layers of melt are coextruded in a coextrusion die to have a film with versatile properties dried from both layers. Layers of the different polymers or resins are combined by either blending the materials in melt before extrusion or by parallel extrusion of the different thermoplastics. The melt flows laminarly through the die and onto a quenched drum. The film is processed conventionally and may be oriented after cooling. Films can contain a variety of additives such as antioxidants, heat stabilizers, UV stabilizers, slip agents, fillers, and anti-block agents.

The barrier layer of the invention can be made by casting an aqueous dispersion or solvent dispersion or solution of a film forming polymer and the cyclodextrin derivative. The aqueous or solvent based material can be formed by commonly available aqueous or solvent based processing of commercially available polymers, polymer dispersions, polymer solutions or both polymer and common aqueous or solvent processing technology. The cyclodextrin derivative material can be combined with such aqueous or solvent based dispersions or solutions to form a film forming or readily formed coating material. Such barrier layers or barrier coatings can be formed using commonly available coating technology including roller coating, doctor blade coating, spin coating, etc. While the coatings can be made and removed from a preparative surface, commonly coatings are formed on a thermoplastic or thermosetting polymer web, and remain in place to act as a barrier layer on a polymeric web used in a packaging. The typical coatings can be made from the same thermoplastic polymer materials used in film sheet or other structural layers using substantially similar loadings of the cyclodextrin derivative material. The barrier layer or barrier coatings formed using the film forming polymer and the cyclodextrin derivative can be used as a single coating layer or can be used in a multiple coating structure having a barrier layer or coating on one or both sides of a structural film or sheet which can be used with other coating layers including printing layers, clear coating layers and other layers conventional in packaging, food packaging, consumer product packaging, etc.

Cyclodextrin

The thermoplastic films of the invention contain a cyclodextrin having pendent moieties or substituents that render the cyclodextrin material compatible with the thermoplastic polymer. For this invention, compatible means that the cyclodextrin material can be uniformly dispersed into the melt polymer, can retain the ability to trap or complex permeant materials or polymer impurity, and can reside in the polymer without substantial reductions in polymer film characteristics. Compatibility can be determined by measuring polymer characteristics such as tensile strength, tear resistance, etc., permeability or transmission rates for permeants, surface smoothness, clarity, etc. Non-compatible derivatives will result in substantial reduced polymer properties, very high permeability or transmission rates and rough dull film. Qualitative compatibility screening can be obtained by preparing small batches (100 grams-one kilogram of thermoplastic and substituted cyclodextrin). The blended material is extruded at production temperatures as a linear strand extrudate having a diameter of about one to five mm. Incompatible cyclodextrin materials will not disperse uniformly in the melt and can be seen in the transparent melt polymer immediately upon extrusion from the extrusion head. We have found the incompatible cyclodextrin can degrade at extrusion temperatures and produce a characteristic "burnt flour" odor in an extrusion. Further, we have found that incompatible cyclodextrin can cause substantial melt fracture in the extrudate which can be detected by visual inspection. Lastly, the extrudate can be cut into small pieces, cross-sectioned and examined using an optical microscope to find incompatible cyclodextrin clearly visible in the thermoplastic matrix.

Cyclodextrin is a cyclic oligosaccharide consisting of at least six glucopyranose units joined by $\alpha(1\rightarrow4)$ linkages.

Although cyclodextrin with up to twelve glucose residues are known, the three most common homologs (α cyclodextrin, β cyclodextrin and γ cyclodextrin) having 6, 7 and 8 residues have been used.

Figure 1B:
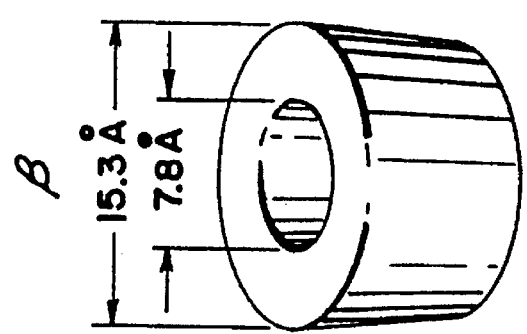
Figure 1C:
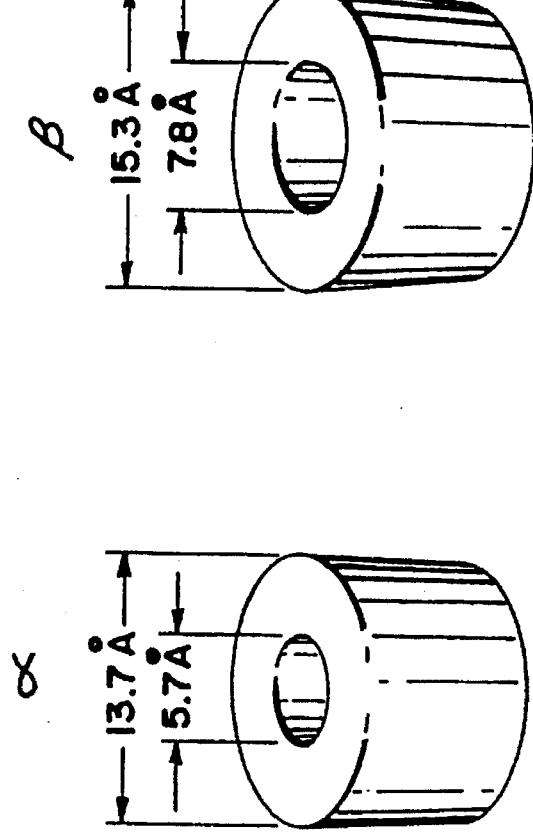

Cyclodextrin is produced by a highly selective enzymatic synthesis. They consist of six, seven, or eight glucose monomers arranged in a donut shaped ring, which are denoted α, β, or γ cyclodextrin respectively (See FIGS. 1A, 1B and 1C, respectively). The specific coupling of the glucose monomers gives the cyclodextrin a rigid, truncated conical molecular structure with a hollow interior of a specific volume. This internal cavity, which is lipophilic (i.e.,) is attractive to hydrocarbon materials (in aqueous systems is hydrophobic) when compared to the exterior, is a key structural feature of the cyclodextrin, providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex.

| CYCLODEXTRIN TYPICAL PROPERTIES | | | | |
|---|---|---|---|---|
| PROPERTIES | CD | α-CD | β-CD | γ-CD |
| Degree of Polymerization (n = ) | | 6 | 7 | 8 |
| Molecular Size (A°) | | | | |
| inside diameter | | 5.7 | 7.8 | 9.5 |
| outside diameter | | 13.7 | 15.3 | 16.9 |
| height | | 7.0 | 7.0 | 7.0 |
| Specific Rotation $[\alpha]^{25}_D$ | | +150.5 | +162.5 | +177.4 |
| Color of iodine complex | | Blue | Yellow | Yellowish Brown |
| Solubility in water (g/100 ml) 25° C. | | | | |
| Distilled Water | | 14.50 | 1.85 | 23.20 |

The oligosaccharide ring forms a torus, as a truncated cone, with primary hydroxyl groups of each glucose residue lying on a narrow end of the torus. The secondary glucopyranose hydroxyl groups are located on the wide end. The parent cyclodextrin molecule, and useful derivatives, can be represented by the following formula (the ring carbons show conventional numbering) in which the vacant bonds represent the balance of the cyclic molecule:

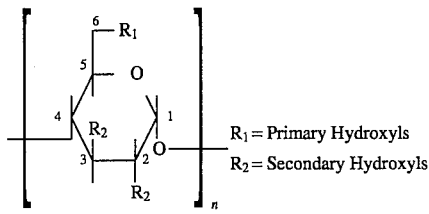

wherein $R_1$ and $R_2$ are primary or secondary hydroxyl as shown.

Cyclodextrin molecules have available for reaction with a chemical reagent the primary hydroxyl at the six position, of the glucose moiety, and at the secondary hydroxyl in the two and three position. Because of the geometry of the cyclodextrin molecule, and the chemistry of the ring substituents, all hydroxyl groups are not equal in reactivity. However, with care and effective reaction conditions, the cyclodextrin molecule can be reacted to obtain a derivatized molecule having all hydroxyl groups derivatized with a single substituent type. Such a derivative is a persubstituted cyclodextrin. Cyclodextrin with selected substituents (i.e.) substituted only on the primary hydroxyl or selectively substituted only at one or both the secondary hydroxyl groups can also be synthesized if desired. Further directed synthesis of a derivatized molecule with two different substituents or three different substituents is also possible. These substituents can be placed at random or directed to a specific hydroxyl. For the purposes of this invention, the cyclodextrin molecule needs to contain sufficient thermoplastic compatible substituent groups on the molecule to insure that the cyclodextrin material can be uniformly dispersed into the thermoplastic and when formed into a clear film, sheet or rigid structure, does not detract from the polymer physical properties.

Apart from the introduction of substituent groups on the CD hydroxyl other molecule modifications can be used. Other carbohydrate molecules can be incorporated into the cyclic backbone of the cyclodextrin molecule. The primary hydroxyl can be replaced using $SN_2$ displacement, oxidized dialdehyde or acid groups can be formed for further reaction with derivatizing groups, etc. The secondary hydroxyls can be reacted and removed leaving an unsaturated group to which can be added a variety of known reagents that can add or cross a double bond to form a derivatized molecule.

Further, one or more ring oxygen of the glycan moiety can be opened to produce a reactive site. These techniques and others can be used to introduce compatibilizing substituent groups on the cyclodextrin molecule.

The preferred preparatory scheme for producing a derivatized cyclodextrin material having a functional group compatible with the thermoplastic polymer involves reactions at the primary or secondary hydroxyls of the cyclodextrin molecule. Broadly we have found that a broad range of pendant substituent moieties can be used on the molecule. These derivatized cyclodextrin molecules can include acylated cyclodextrin, alkylated cyclodextrin, cyclodextrin esters such as tosylates, mesylate and other related sulfo derivatives, hydrocarbyl-amino cyclodextrin, alkyl phosphono and alkyl phosphato cyclodextrin, imidazoyl substituted cyclodextrin, pyridine substituted cyclodextrin, hydrocarbyl sulphur containing functional group cyclodextrin, silicon-containing functional group substituted cyclodextrin, carbonate and carbonate substituted cyclodextrin, carboxylic acid and related substituted cyclodextrin and others. The substituent moiety must include a region that provides compatibility to the derivatized material.

Acyl groups that can be used as compatibilizing functional groups include acetyl, propionyl, butyryl, trifluoroacetyl, benzoyl, acryloyl and other well known groups. The formation of such groups on either the primary or secondary ring hydroxyls of the cyclodextrin molecule involve well known reactions. The acylation reaction can be conducted using the appropriate acid anhydride, acid chloride, and well known synthetic protocols. Peracylated cyclodextrin can be made. Further, cyclodextrin having less than all of available hydroxyls substituted with such groups can be made with one or more of the balance of the available hydroxyls substituted with other functional groups.

Cyclodextrin materials can also be reacted with alkylating agents to produced an alkylated cyclodextrin. Alkylating groups can be used to produce peralkylated cyclodextrin using sufficient reaction conditions exhaustively react available hydroxyl groups with the alkylating agent. Further, depending on the alkylating agent, the cyclodextrin molecule used in the reaction conditions, cyclodextrin substituted at less than all of the available hydroxyls can be produced. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant.

Tosyl(4-methylbenzene sulfonyl) mesyl (methane sulfonyl) or other related alkyl or aryl sulfonyl forming reagents can be used in manufacturing compatibilized cyclodextrin molecules for use in thermoplastic resins. The primary —OH groups of the cyclodextrin molecules are more readily reacted than the secondary groups. However, the molecule can be substituted on virtually any position to form useful compositions.

Such sulfonyl containing functional groups can be used to derivatize either of the secondary hydroxyl groups or the primary hydroxyl group of any of the glucose moieties in the cyclodextrin molecule. The reactions can be conducted using a sulfonyl chloride reactant that can effectively react with either primary or secondary hydroxyl. The sulfonyl chloride is used at appropriate mole ratios depending on the number of target hydroxyl groups in the molecule requiring substitution. Both symmetrical (per substituted compounds with a single sulfonyl moiety) or unsymmetrical (the primary and secondary hydroxyls substituted with a mixture of groups including sulfonyl derivatives) can be prepared using known reaction conditions. Sulfonyl groups can be combined with acyl or alkyl groups generically as selected by the experimenter. Lastly, monosubstituted cyclodextrin can be made wherein a single glucose moiety in the ring contains between one and three sulfonyl substituents. The balance of the cyclodextrin molecule remaining unreacted.

Amino and other azido derivatives of cyclodextrin having pendent thermoplastic polymer containing moieties can be used in the sheet, film or container of the invention. The sulfonyl derivatized cyclodextrin molecule can be used to generate the amino derivative from the sulfonyl group substituted cyclodextrin molecule via nucleophilic displacement of the sulfonate group by an azide ($N_3^{-1}$) ion. The azido derivatives are subsequently converted into substituted amino compounds by reduction. Large numbers of these azido or amino cyclodextrin derivatives have been manufactured. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen containing group. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include dialkylamino such as dimethylamino, diethylamino, piperidino, piperizino, quaternary substituted alkyl or aryl ammonium chloride substituents, halogen derivatives of cyclodextrins can be manufactured as a feed stock for the manufacture of a cyclodextrin molecule substituted with a compatibilizing derivative. In such compounds the primary or secondary hydroxyl groups are substituted with a halogen group such as fluoro, chloro, bromo, iodo or other substituents. The most likely position for halogen substitution is the primary hydroxyl at the 6-position.

Hydrocarbyl substituted phosphono or hydrocarbyl substituted phosphato groups can be used to introduce compatible derivatives onto the cyclodextrin. At the primary hydroxyl, the cyclodextrin molecule can be substituted with alkyl phosphato, aryl phosphato groups. The 2, and 3, secondary hydroxyls can be branched using an alkyl phosphato group.

The cyclodextrin molecule can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Apart from the sulfonyl acylating groups found above, sulfur containing groups manufactured based on sulfhydryl chemistry can be used to derivatize cyclodextrin. Such sulfur containing groups include methylthio (—SMe), propylthio (—SPr), t-butylthio (—S—C(CH$_3$)$_3$), hydroxyethylthio (—S—CH$_2$CH$_2$OH), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Such groups include hydroxyethyl, 3-hydroxypropyl, methyloxylethyl and corresponding oxeme isomers, formyl methyl and its oxeme isomers, carbylmethoxy (—O—CH$_2$CO$_2$H), carbylmethoxymethyl ester (—O—CH$_2$CO$_2$—CH$_3$). Cyclodextrin with derivatives formed using silicone chemistry can contain compatibilizing functional groups.

Cyclodextrin derivatives with functional groups containing silicone can be prepared. Silicone groups generally refer to groups with a single substituted silicon atom or a repeating silicone-oxygen backbone with substituent groups. Typically, a significantly proportion of silicone atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups and can be further substituted with a variety of functional groups. For the purposes of this invention the simple silicone containing substituent moieties are preferred including trimethylsilyl, mixed methyl-phenyl silyl groups, etc. We are aware that certain βCD and acetylated and hydroxy alkyl derivatives are available from American Maize-Products Co., Corn Processing Division, Hammond, Ind.

Packages and Packed Items

The thermoplastic containing the compatible derivatized cyclodextrin can be used in a variety of packaging formats to package a variety of items. General packaging ideas can be used. For example, the items can be packaged entirely in a film pouch, bag, etc. Further, the film can be used as a film closure on a rigid plastic container. Such containers can have a rectangular, circular, square or other shaped cross-section, a flat bottom and an open top. The container and a thermoplastic film closure can be made of the thermoplastic materials of the invention. Further, the thermoplastics of the invention can be used in the formation of blister pack packaging, clam shell type enclosures, tub, tray, etc. Generally, two product types require packaging in thermoplastic film of the invention having substantial barrier properties. In one product type, protecting the product from contamination from permeant sources outside the packaging material is important. Protecting food items from contamination by aromatic and aliphatic hydrocarbons, fluorocarbons, ink and packaging residue, exhaust from transportation equivalent and other internal combustion engines, perfumes commonly used in a variety of consumer products such as scented paper products, bar soap, scented bath products, cleaners, fabric softeners, detergents, dry bleaches, disinfectants, etc. All food items are the most common material requiring protection from outside contamination, other items can be sensitive to odors. Further, a variety of materials must be packaged in barrier materials preventing the odor of the material from exiting the package. A large variety of food odors are readily transmitted by a variety of packaging materials. Such food odors can attract insect and rodent pests, can be objectionable to customers or employees or can result in the substantial loss of important fragrance notes from packaged materials reducing product value. Important odors requiring substantial barriers include odors derived from coffee, ready to eat cereal, frozen pizza, cocoa or other chocolate products, dry mix gravies and soups, snack foods (chips, crackers, popcorn, etc.), baked foods, dry pet food (cat food, etc.), butter or butter-flavor notes, meat products, in particular butter or butter-flavor notes used in the manufacture of microwave popcorn in microwaveable paper containers, fruits and nuts, etc.

The above explanation of the nature of the cyclodextrin derivatives, thermoplastic films, manufacturing detail regarding the production of film, and the processes of cyclodextrin to make compatible derivatives provides a basis for understanding technology involving incorporating compatible cyclodextrin in thermoplastic film for barrier purposes. The following examples, film preparation and permeation data provide a further basis for understanding the invention and includes the best mode.

After our work in producing derivatives of cyclodextrins and compounding the cyclodextrins in thermoplastic films, we have found that the cyclodextrins can be readily derivatized using a variety of known chemical protocols. The cyclodextrin material can be melt blended into thermoplastic materials smoothly resulting in clear extrudable thermoplastic materials with the cyclodextrin materials uniformly distributed throughout the thermoplastic. Further, we have found that the cyclodextrin derivatives can be combined with a broad variety of thermoplastic films. The cyclodextrin materials can be incorporated into the films in a broad range of cyclodextrin concentrations. The cyclodextrin containing thermoplastic materials can be blown into films of varying thickness and can be blown free of melt fracture or other film or sheet variation. We have found in our experimentation that the barrier properties, i.e. reduction in transmission rate of aromatic hydrocarbons, aliphatic hydrocarbons, ethanol and water vapor can be achieved using the cyclodextrin derivative technology. We have also found that the use of cyclodextrin materials improve the surface properties of the film. The surface tension of the film surface and surface electrical properties were also improved. Such a result increases the utility of the films of the invention in coating, printing, laminating, handling, etc. In initial work we have also found (1) several modified cyclodextrin candidates were found to be compatible with the LLDPE resin and provide good complexation of residual LLDPE volatile contaminants as well as reduce organic permeants diffusing through the film. (2) Unmodified βCD adversely affects transparency, thermal stability, machinability, and barrier properties of the film. Conversely, selected modified βCD (acetylated and trimethylsilyl ether derivatives) have no affect on transparency and thermal stability. The machinability of the extruded plastic material is effected somewhat causing some surface defects, thereby reducing the barrier properties of the film. (3) Films containing a modified βCD composition (1% by weight) reduce aromatic permeants by 35% at 72° F. and 38% at 105° F.; aliphatic permeants were reduced by only 9% at 72° F. These results would improve significantly if worst case shelf-life testing conditions were not used to test the films. (4) Complexation rates were different for aromatic and aliphatic permeants. Films containing modified βCD had better complexation rates for aromatics (gasoline-type compounds) than aliphatic (printing ink-type compounds). Conversely, film coating had significantly better complexation of aliphatic compound than aromatic compounds. (5) βCD containing acrylic coatings were the star performers reducing aliphatic permeants from 46% to 88%, while aromatics were reduced by 29%.

QUALITATIVE PREPARATION

Initially, we produced four experimental test films. Three of the films contained β-cyclodextrin βCD at loading of 1%, 3% and 5% (wt./wt.) while the fourth was a control film made from the same batch of resin and additives but without βCD. The 5% loaded βCD film was tested for complexation of residual organic in the test film. Even though βCD was found to effectively complex residual organics in the linear low density polyethylene (LLDPE) resin, it was incompatible with the resin and formed βCD particle agglomerations.

We have evaluated nine modified βcyclodextrins and a milled β-cyclodextrin (particle size 5 to 20 microns). The different cyclodextrin modifications were acetylated, octanyl succinate, ethoxyhexyl glycidyl ether, quaternary amine, tertiary amine, carboxymethyl, succinylated, amphoteric and trimethylsilyl ether. Each experimental cyclodextrin (1% loading wt/wt) was mixed with low density polyethylene (LLDPE) using a Littleford mixer and then extruded using a twin screw Brabender extruder.

The nine modified cyclodextrin and milled cyclodextrin LLDPE profiles were examined under an optical microscope at 50X and 200X magnification. The microscopic examination was used to visually check for compatibility between LLDPE resin and cyclodextrin. Of the ten cyclodextrin candidates tested, three (acetylated, octanyl succinate and trimethylsilyl ether) were found visually to be compatible with the LLDPE resin.

Complexed residual film volatiles were measured using cryotrapping procedure to test 5% βCD film sample and three extruded profiles containing 1% (wt/wt) acetylated βCD octanyl succinate βCD and trimethylsilyl ether. The method consists of three separate steps; the first two are carried out simultaneously while the third, an instrumental technique for separating and detecting volatile organic compounds, is conducted after one and two. In the first step, an inert pure, dry gas is used to strip volatiles from the sample. During the gas stripping step, the sample is heated at 120° C. The sample is spiked with a surrogate (benzene-d6) immediately prior to the analysis. Benzene-$d_6$ serves as an internal QC surrogate to correct each set of test data for recovery. The second step concentrates the volatiles removed from the sample by freezing the compounds from the stripping gas in a headspace vial immersed in a liquid nitrogen trap. At the end of the gas-stripping step, an internal standard (toluene-d8) is injected directly into the headspace vial and the vial is capped immediately. Method and system blanks are interspersed with samples and treated in the same manner as samples to monitor contamination. The concentrated organic components are then separated, identified and quantitated by heated headspace high resolution gas chromatography/mass spectrometry (HRGC/MS). The results of the residual volatile analyses are presented in the table below:

TABLE 1

| Sample Identification | % Volatile Complexation as Compared to Control |
|---|---|
| 5% βCD Blown Film | 80 |
| 1% Acylated βCD Profile | 47 |
| 1% Octanyl Succinate βCD Profile | 0 |
| 1% Trimethylsilyl ether Profile | 48 |
| 1% βCD Milled Profile | 29 |

In these preliminary screening tests, βCD derivatives were shown to effectively complex trace volatile organics inherent in low density polyethylene resin used to make experimental film. In 5% βCD loaded LLDPE film, approximately 80% of the organic volatiles were complexed. However, all βCD films (1% and 5%) had an off-color (light brown) and off-odor. The color and odor problem is believed to be the result of direct decomposition of the CD or impurity in the CD. Two odor-active compounds (2-furaldehyde and 2-furanmethanol) were identified in the blown film samples.

Of the three modified compatible CD candidates (acetylated, octanyl succinate and trimethylsilyl ether), the acetylated and trimethylsilyl ether CD were shown to effectively complex trace volatile organics inherent in the LLDPE resin. One percent loadings of acetylated and trimethylsilyl ether (TMSE) βCD showed approximately 50% of the residual LPDE organic volatiles were complexed, while the octanyl succinate CD did not complex residual LLDPE resin volatiles. Milled βCD was found to be less effective (28%) than the acetylated and TMSE modified βCD's.

Plastic packaging materials all interact to some degree with the food product they protect. The main mode of interaction of plastic packaging of food is through the migration of organic molecules from the environment through the polymer film into the head space of the package where they are absorbed by the food product. Migration or transfer of organic molecules of the package to the food, during storage, is effected by environmental conditions such as temperature, storage time, and other environmental factors (e.g., humidity, type of organic molecules and concentration thereof). Migration can have both quality (consumer resistance) and toxicological influence. The objective of packaging film testing is to measure how specific barriers may influence the quality of packaged individual foods. To simulated accelerated shelf-life testing for low-water-activity food products, the testing was conducted at a temperature of 72° F. and 105° F., and a relative humidity of 60%. These temperature and humidity conditions are probably similar to those found in uncontrolled warehouses, in transit, and in storage.

If a polymer is moisture sensitive, the relative humidity can affect the film's performance especially in low-water-activity food products. Because a packaging film during actual end-use conditions will be separating two moisture extremes, relative humidity in the permeation device was controlled on both sides of the film. The environment side, representing the outside of the package, was maintained at 60% relative humidity, and the sample side, representing the inside of a package containing a low-water-activity product, at 0.25.

A combination of permeants was used to measure the function and performance of the CD. A combination was used to be realistic, since gasoline (principally an aromatic hydrocarbon mixture) and printing ink solvents (principally an aliphatic hydrocarbon mixture) are not formed from a single compound but are a mixture of compounds.

The aromatic permeant contained ethanol (20 ppm), toluene (3 ppm), p-xylene (2 ppm), o-xylene (1 ppm), trimethylbenzene (0.5 ppm) and naphthalene (0.5 ppm). The aliphatic permeant, a commercial paint solvent blend containing approximately twenty (20) individual compounds, was 20 ppm.

The permeation test device FIG. 3 consists of two glass permeation cells or flasks with cavities of 1200 ml (environment cell or feed side) and 300 ml (sample cell or permeating side).

Experimental film performance was measured in the closed-volume permeation device. High-resolution gas chromatograph (HRGC) operated with a flame ionization detector (FID) was used to measure the change in the cumulative penetrant concentration as a function of time. Sample-side (food product side) compound concentrations are calculated from each compound's response factor. Concentrations are reported in parts per million (ppm) on a volume/volume basis. The cumulative penetrant concentration on the sample-side of the film is plotted as a function of time.

We produced four experimental test films. Three of the films contained βCD at loading of 1%, 3% and 5% (wt/wt) while the fourth was a control film made from the same batch of resin and additives but without βCD.

A second experimental technique was also undertaken to determine whether βCD sandwiched between two control films will complex organic vapors permeating the film. The experiment was carried out by lightly dusting βCD between two control film sheets.

The testing showed the control film performed better than βCD loaded films. The permeation test results also demonstrated the higher the βCD loading the poorer the film performed as a barrier. The test results for sandwiching βCD between two control films showed βCD being twice as effective in reducing permeating vapors than the control samples without βCD. This experiment supported that CD does complex permeating organic vapors in the film if the film's barrier qualities are not changed during the manufacturing process making the film a less effective barrier.

The 1% TMSE βCD film was slightly better than the 1% acetylated βCD film (24% -vs- 26%) for removing aromatic permeants at 72° F. adding more modified CD appeared to have no improvement.

For aromatic permeants at 105° F., both 1% TMSE βCD and 1% acetylated βCD are approximately 13% more effective removing aromatic permeants than 72° F. The 1% TMSE film was again slightly better than the 1% film (36% -vs- 31%) for removing aromatic permeants.

The 1% TMSE film was more effective initially removing aliphatic permeants than the 1% acetylated βCD film at 72° F. But for the duration of the test, 1% TMSE βCD was worse than the control while 1% acetylated βCD removed only 6% of the aliphatic permeants.

We produced two experimental aqueous coating solutions. One solution contained hydroxyethyl βCD (35% by weight) and the other solution contained hydroxypropyl βCD (35 by weight). Both solutions contained 10% of an acrylic emulsion comprising a dispersion of polyacrylic acid having a molecular weight of about 150,000 (Polysciences, Inc.) (15% solids by weight) as a film forming adhesive. These solutions were used to hand-coat test film samples by laminating two LLDPE films together. Two different coating techniques were used. The first technique very slightly stretched two film samples flat, the coating was then applied using a hand roller, and then the films were laminated together while stretched flat. The Rev. 1 samples were not stretched during the lamination process. All coated samples were finally placed in a vacuum laminating press to remove air bubbles between the film sheets. Film coating thicknesses were approximately 0.0005 inches. These CD coated films and hydroxylmethyl cellulose coated control films were subsequently tested.

A reduction in aromatic and aliphatic vapors by the hydroxyethyl βCD coating is greater in the first several hours of exposure to the vapor and then diminishes over the next 20 hours of testing. Higher removal of aliphatic vapors than aromatic vapors was achieved by the hydroxyethyl βCD coating; this is believed to be a function of the difference in their molecular size (i.e., aliphatic compounds are smaller than aromatic compounds). Aliphatic permeants were reduced by 46% as compared to the control over the 20 hour test period. Reduction of aromatic vapors was 29% as compared to the control over the 17 hour test period.

The Rev. 1 coated hydroxyethyl βCD reduced the aliphatic permeants by 87% as compared to the control over the 20 hour test period. It is not known if the method of coating the film was responsible for the additional 41% reduction over the other hydroxyethyl βCD coated film.

The hydroxyethyl βCD coating was slightly better for removing aromatic permeants than the hydroxypropyl βCD coating (29% -vs- 20%) at 72° F.

LARGE SCALE FILM EXPERIMENTAL

Preparation of Cyclodextrin Derivatives

EXAMPLE I

An acetylated β-cyclodextrin was obtained that contained 3.4 acetyl groups per cyclodextrin on the primary —OH group.

EXAMPLE II

Trimethyl Silyl Ether of β-cyclodextrin

Into a rotary evaporator equipped with a 4000 milliliter round bottom flask and a nitrogen atmosphere, introduced at a rate of 100 milliliters $N_2$ per minute, was placed three liters of dimethylformamide. Into the dimethylformamide was placed 750 grams of β-cyclodextrin. The β-cyclodextrin was rotated and dissolved in dimethylformamide at 60° C. After dissolution, the flask was removed from the rotary evaporator and the contents were cooled to approximately 18° C. Into the flask, placed on a magnetic stirrer and equipped with a stir bar, was added 295 milliliters of hexamethyldisilylazine (HMDS-Pierce Chemical No. 84769), followed by the careful addition of 97 milliliters of trimethylchlorosilane (TMCS-Pierce Chemical No. 88531). The careful addition was achieved by a careful dropwise addition of an initial charge of 20 milliliters and after reaction subsides the careful dropwise addition of a subsequent 20 milliliter portions, etc. until addition is complete. After the addition of the TMCS was complete, and after reaction subsides, the flask and its contents were placed on the rotary evaporator, heated to 60° C. while maintaining an inert nitrogen atmosphere flow of 100 milliliters of $N_2$ per minute through the rotary evaporator. The reaction was continued for four hours followed by removal of solvent, leaving 308 grams of dry material. The material was removed from the flask by filtering, washing the filtrate with deionized water to remove the silylation products, vacuum oven drying (75° C. at 0.3 inches of Hg) and stored as a powdered material and maintained for subsequent compounding with a thermoplastic material. Subsequent spectrographic inspection of the material showed the β-cyclodextrin to contain approximately 1.7 trimethylsilylether substituent per β-cyclodextrin molecule. The substitution appeared to be commonly on a primary 6-carbon atom.

EXAMPLE III

An hydroxypropyl β-cyclodextrin was obtained with 1.5 hydroxypropyl groups per molecule on the primary 6—OH group of the βCD.

EXAMPLE IV

An hydroxyethyl β-cyclodextrin was obtained with 1.5 hydroxyethyl groups per molecule on the primary 6—OH group of the βCD.

Preparation of Films

We prepared a series of films using a linear low density polyethylene resin, βCD and derivatized βCD such as the acetylated or the trimethylsilyl derivative of a β-cyclodextrin. The polymer particles were dry blended with the powdered β-cyclodextrin and β-cyclodextrin derivative material, a fluoropolymer lubricant (3M) and the antioxidant until uniform in the dry blend. The dry blend material was mixed and extruded in a pellet form in a Haake System 90, ¾" conical extruder. The resulting pellets were collected for film preparation.

Table IA displays typical pelletizing extruder conditions. The films were blown in the apparatus of FIG. 2. FIG. 2 shows extruded thermoplastic tube 21 exiting the die 22. The tube is collapsed by die 23 and layered by rollers 24 into the film 25. The extruded tube 21 is inflated using air under pressure blown through air inlet tube 26. The thermoplastic is melted in the extruder. The extruder temperature is taken at the mixing zone 27. The melt temperature is taken in the melt zone 28 while the die temperature is taken in the die 29. The extrudate is cooled using an air blown cooling stream from the cooling ring 20. The general schematic background of FIG. 2 is representative of the Kiefel blown film extruder, 40 mm die diameter, used in the actual preparation of the blown film. The film is manufactured according to the above protocol and reported in Table IB. The film was tested for transmission rates at a variety of environmental conditions. Environmental test conditions are shown below in Table II.

TABLE IA 0.5% TMSE Pelletizing 1-19-94

| Run Time | 0 min 13 sec | Torque Tot. Torque | | 4866 meter-gram 0.0 mkg-min | | Rotor Aux. | 198 rpm 0% | |
|---|---|---|---|---|---|---|---|---|
| Channels | --1-- | --2-- | --3-- | --4-- | --5-- | --6-- | | |
| Melt Temp | 37 | 41 | 41 | 41 | 41 | | | °C. |
| Set Temp | 150 | 160 | 160 | 170 | 0 | 0 | | °C. |
| Deviation | 0 | 0 | 0 | 0 | 0 | 0 | | °C. |
| Cooling | Yes | Yes | Yes | Yes | | | | |
| Pressure | 0 | 0 | 2739 | 0 | 0 | | | psi |

TABLE IB

Extruded Films (Exxon LL3201) Made With Low Density Polyethylene

| Roll No. | Sample ID | Fluoropolymer Additive[1] | Extruder Temp. Zone 3 (F.) | Melt Temp (F.) | Die Temp. Zone 3 (F.) | Lbs./Hr | RPM | Die Gap | Comments |
|---|---|---|---|---|---|---|---|---|---|
| 1 | Control | 500ppm | 428 | 406 | 406 | 30.1 | 50 | 24 | |
| 2 | 1% Ex. I | 1000ppm | 441 | 415 | 420 | 29.7 | 50 | 35 | |
| 3 | 1% Ex. I | 1000ppm | 441 | 416 | 420 | 28.5 | 50 | 35 | |
| 4 | 1% Ex. I | 500ppm | 441 | 415 | 420 | 29.9 | 50 | 35 | |
| 5 | 1% Ex. I | 500ppm | 418 | 405 | 414 | 29.9 | 50 | 35 | |
| 6 | 1% Ex. I | 500ppm | 421 | 397 | 414 | 29.0 | 50 | 35 | |
| 7 | 0.5% Ex. I | 500ppm | 421 | 403 | 415 | 29.0 | 50 | 35 | |
| 8 | 2% Ex. I | 500ppm | 421 | 404 | 415 | 27.7 | 50 | 35 | Very slight melt fracture |
| 9 | 1% Ex. II | 500ppm | 421 | 406 | 415 | 28.3 | 50 | 35 | Particles in film. |
| 10 | 1% Ex. II | 500ppm | 426 | 410 | 415 | 26.7 | 50 | 35 | Particles in film. |
| 11 | 1% Ex. II | 500ppm | 432 | 415 | 414 | 29.0 | 50 | 35 | Particles in film. Very slight yellowing to film. |
| 12 | 1% Ex. II | 500ppm | 431 | 414 | 415 | 21.5 | 39 | 35 | Particles in film. |
| 13 | 0.5% Ex. II | 500ppm | 431 | 415 | 415 | 27.7 | 50 | 35 | Particles in film. |
| 14 | 0.5% Ex. II | 500ppm | 425 | 410 | 415 | 28.9 | 50 | 35 | Particles in film. |
| 15 | 2% Ex. II | 500ppm | 410 | 414 | 415 | 20.2 | 38 | 35 | Particles in film. Very slight yellowing to film. |
| 16 | 2% Ex. II | 500ppm | 422 | 415 | 415 | 20.5 | 38 | 35 | Particles in film. Very slight yellowing to film. |
| 17 | 2% Ex. II | 500ppm | 422 | 416 | 415 | 20.5 | 38 | 35 | Particles in film. Very |

Also contains 500 ppm Irganox 1010 antioxidant and 1000 ppm IrgaFos 168.

TABLE II

Test Conditions

| Roll Sample ID Number | Temp. (F.) | Sample Side | Environ. Side | Permeant[2] |
|---|---|---|---|---|
| Roll #2 | 72 | Rm % RH | Rm % RH | Aromatic/Alcohol |
| Roll #3 | | | | |
| Roll #5 | | | | |
| Roll #6 | | | | |
| Roll #5 | 72 | Rm % RH | Rm % RH | Aromatic/Alcohol |
| Roll #8 | | | | |
| Roll #7 | 72 | 0.25 Aw | 60% RH | Aromatic/Alcohol |
| Roll #5 | | | | |
| Roll #8 | | | | |
| Roll #7 | 72 | .60 Aw | 30% RH | Aromatic/Alcohol |
| Roll #5 | | | | |
| Roll #8 | | | | |
| Roll #2 | 105 | Rm % RH | Rm % RH | Aromatic/Alcohol |
| Roll #3 | | | | |
| Roll #4 | | | | |
| Roll #5 | | | | |
| Roll #6 | | | | |
| Roll #8 | | | | |
| Roll #12 | | | | |
| Roll #7 | 105 | 0.25 Aw | 15% RH | Aromatic/Alcohol |
| Roll #5 | | | | |
| Roll #8 | | | | |
| Roll #13 | 72 | Rm % RH | Rm % RH | Aromatic/Alcohol |
| Roll #14 | | | | |
| Roll #9 | | | | |
| Roll #9 | | | | |
| Roll #11 | | | | |
| Roll #12 | | | | |

[2]7 ppm aromatic plus 20 ppm ETOH.

| Roll Sample ID Number | Temp. (F.) | Sample Side | Environ. Side | Permeant[34] |
|---|---|---|---|---|
| Roll #15 | | | | |
| Roll #16 | | | | |
| Roll #17 | | | | |
| Roll #14 | 105 | Rm % RH | Rm % RH | Aromatic/Alcohol |
| Roll #15 | | | | |
| 10% Ex. III in PVdC | 72 | 0.25 Aw | 60% RH | Aromatic/Alcohol |
| 20% Ex. III in PVdC | | | | |
| 5% Ex. III/Acrylic | 72 | Rm % RH | Rm % RH | Aromatic/Alcohol |
| 10% Ex. III/Acrylic | | | | |
| Roll #7 | 72 | Rm % RH | Rm % RH | Naphtha |

TABLE II-continued

Test Conditions

| | | | | |
|---|---|---|---|---|
| Roll #5 | | | | |
| Roll #8 | | | | |
| Roll #12 | 72 | Rm % RH | Rm % RH | Naphtha |
| Roll #15 | | | | |

[3] 7 ppm aromatic plus 20 ppm ETOH.
[4] 40 ppm Naphtha

The results of the testing show that the inclusion of a compatible cyclodextrin material in the thermoplastic films of the invention substantially improves the barrier properties by reducing transmission rate of a variety of permeants. The data showing the improvement in transmission rate is shown below in the following data tables.

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Aromatics % Improvement Over Control | Total Volitiles Transmission Rate* | Tot. Volitiles % Improvement Over Control |
|---|---|---|---|---|
| Control Film | 3.35E-04 | 0% | 3.79E-04 | 0% |
| 1.0% CS-001 (Roll #2) | 3.18E-04 | 5% | 3.61E-04 | 5% |
| 1.0% CS-001 (Roll #3) | 2.01E-04 | 40% | 2.55E-04 | 33% |
| 1.0% CS-001 (Roll #5) | 2.67E-04 | 20% | 3.31E-04 | 13% |
| 1.0% CS-001 (Roll #6) | 3.51E-04 | −5% | 3.82E-04 | −1% |

| Sample Identification | Aromatic Transmission Rate* | Naphtha % Improvement Over Control |
|---|---|---|
| Control Film (Roll #1) | 7.81E-03 | 0% |
| 0.5% CS-001 (Roll #7) | 7.67E-03 | 2% |
| 1% CS-001 (Roll #5) | 7.37E-03 | 6% |
| 2% CS-001 (Roll #8) | 6.53E-03 | 16% |

$$* \frac{gm \cdot 0.001 \, in.}{100 \, in^2 \cdot 24 \, hrs.}$$

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 5.16E-04 | 0% | 5.63E-04 | 0% |
| 1.0% CS-001 (Roll #5) | 4.01E-04 | 22% | 5.17E-04 | 8% |
| 2.0% CS-001 (Roll #8) | 2.91E-04 | 44% | 3.08E-04 | 45% |

| Sample Identification | Aromatic Transmission Rate* | Naphtha % Improvement Over Control |
|---|---|---|
| Control Film (Roll #1) | 7.81E-03 | 0% |
| 0.5% CS-001 (Roll #7) | 7.67E-03 | 2% |
| 1% CS-001 (Roll #5) | 7.37E-03 | 6% |
| 2% CS-001 (Roll #8) | 6.53E-03 | 16% |

-continued
Comparison of Transmission Rates in Modified β-Cyclodextrin - LPDE Films
Temperature 72° F.
Sample Side: Room % RH
Environment: Room % RH \* $\dfrac{gm \cdot 0.001 \text{ in.}}{100 \text{ in}^2 \cdot 24 \text{ hrs.}}$

Comparison of Transmission Rates in Modified β-Cyclodextrin - LLPDE Films
Temperature 72° F.
Sample Side: 0.25 Aw
Environment: 60% RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 3.76E-04 | 0% | 3.75E-04 | 0% |
| 0.5% CS-001 (Roll #7) | 2.42E-04 | 36% | 2.41E-04 | 36% |
| 1% CS-001 (Roll #5) | 3.39E-04 | 10% | 3.38E-04 | 10% |
| 2% CS-001 (Roll #8) | 2.48E-04 | 34% | 2.47E-04 | 34% |

Comparison of Transmission Rates in Modified β-Cyclodextrin - LPDE Films
Temperature 105° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 1.03E-03 | 0% | 1.13E-03 | 0% |
| 1% CS-001 (Roll #2) | 5.49E-04 | 47% | 5.79E-04 | 49% |
| 1% CS-001 (Roll #3) | 4.74E-04 | 54% | 5.00E-04 | 56% |
| 1% CS-001 (Roll #4) | 6.41E-04 | 38% | 6.83E-04 | 40% |
| 1% CS-001 (Roll #5) | 5.22E-04 | 49% | 5.54E-04 | 51% |
| 1% CS-001 (Roll #6) | 4.13E-04 | 60% | 4.39E-04 | 61% |
| 2% CS-001 (Roll #8) | 5.95E-04 | 42% | 6.18E-04 | 45% |
| 1% TMSE (Roll #12) | 8.32E-04 | 19% | 8.93E-04 | 21% |

\* $\dfrac{gm \cdot 0.001 \text{ in.}}{100 \text{ in}^2 \cdot 24 \text{ hrs.}}$

Comparison of Transmission Rates in Modified β-Cyclodextrin - LPDE Films
Temperature 105° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 4.34E-04 | 0% | 4.67E-04 | 0% |
| 0.5% CS-001 (Roll #7) | 4.03E-04 | 7% | 4.41E-04 | 6% |
| 1.0% CS-001 | 5.00E-04 | -15% | 5.33E-04 | -14% |

| Comparison of Transmission Rates in Modified β-Cyclodextrin - LPDE Films | | | | |
|---|---|---|---|---|
| (Roll #5) 2.0% CS-001 (Roll #8) | 3.96E-04 | 9% | 3.94E-04 | 16% |

Temperature 72° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film | 3.09E-04 | 0% | 3.45E-04 | 0% |
| 0.5% TMSE (Roll #13) | 2.50E-04 | 19% | 2.96E-04 | 14% |
| 0.5% TMSE (Roll #14) | 2.37E-04 | 23% | 2.67E-04 | 33% |
| 1% TMSE (Roll #9) | 2.67E-04 | 14% | 3.05E-04 | 12% |
| 1% TMSE (Roll #10) | 4.85E-04 | −57% | 5.27E-04 | −53% |
| 1% TMSE (Roll #11) | 2.58E-04 | 17% | 2.92E-04 | 15% |
| 1% TMSE (Roll #12) | 2.15E-04 | 31% | 2.55E-04 | 26% |
| 2% TMSE (Roll #15) | 2.54E-04 | 18% | 3.04E-04 | 12% |
| 2% TMSE (Roll #16) | 2.79E-04 | 10% | 3.21E-04 | 7% |
| 2% TMSE (Roll #17) | 2.81E-04 | 9% | 3.24E-04 | 6% |

* $\dfrac{gm \cdot 0.001 \text{ in.}}{100 \text{ in}^2 \cdot 24 \text{ hrs.}}$

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 9.43E-03 | 0% |
| 1% TMSE (Roll #12) | 1.16E-02 | −23% |
| 2% TMSE (Roll #15) | 1.56E-02 | −65% |

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 8.36E-04 | 0% | 9.05E-04 | 0% |
| 0.5% TMSE (Roll #14) | 6.77E-04 | 19% | 7.25E-04 | 20% |
| 2% TMSE (Roll #15) | 6.36E-04 | 24% | 6.81E-04 | 25% |

* $\dfrac{gm \cdot 0.001 \text{ in.}}{100 \text{ in}^2 \cdot 24 \text{ hrs.}}$

Comparison of Transmission Rates in
Modified β-Cyclodextrin - LPDE Films

Temperature 72° F.
Sample Side: 0.25 Aw
Environment: 60% RH

| Sample Identification | Aromatic Transmission Rate* | Aromatics % Improvement Over Control | Total Volatiles Transmission Rate* | T. Volatiles % Improvement Over Control |
|---|---|---|---|---|
| PVdC Control | 6.81E-05 | 0% | 1.05E-04 | 0% |
| PVdC w/10% HP B-Cyd | 1.45E-05 | 79% | 2.39E-05 | 77% |
| PVdC w/20% HP B-Cyd | 9.71E-05 | −42% | 1.12E-04 | −7% |

Temperature 72° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Acrylic | 2.07E-06 | 0% | 2.10E-05 | 0% |
| 5% HP B-Cyd/ Acrylic | 1.50E-06 | 27% | 2.07E-05 | 1% |
| 10% HP B-Cyd/ Acrylic | 4.13E-06 | −100% | 4.30E-05 | −105% |

\* $\dfrac{\text{gm} \cdot 0.001 \text{ in.}}{100 \text{ in}^2 \cdot 24 \text{ hrs.}}$ We prepared a series of aqueous coatings containing hydroxypropyl βCD. One of the coatings was prepared from a 10% acrylic emulsion (a polyacrylic acid polymer having a molecular weight of about 150,000 purchased from Polysciences, Inc.). The 10% acrylic emulsion contained hydroxypropyl βCD at a 5% and 10% by weight loading. These solutions were used to hand-coat test film samples by laminating two films. The coatings were applied to linear low density polyethylene film sheet containing 0.5% acetylated βCD (Roll No. 7) and to a second film sheet containing 2% acetylated βCD (Roll No. 8) using a hand roller and then laminating the films. The films were not stretched during lamination. All coated samples were placed in a vacuum laminating press to remove air bubbles between the film sheets. The acrylic coating thickness was about 0.0002 inch. An acrylic coated control was prepared in an identical manner containing no hydroxypropyl βCD. The multilayer structure was tested with the 0.5% acetylated βCD film facing the environmental flask side of the test cell (FIG. 3).

A second coating was prepared from a vinylidene chloride latex (PVDC, 60 wt-% solids) purchased from Dagax Laboratories, Inc. The PVDC latex coating was prepared with two levels of hydroxypropyl βCD—10% and 20% by weight of the derivatized cyclodextrin. These solutions were used to hand-coat linear low density polyethylene test film samples by laminating the two films together. The coatings were applied to two control film sheets (rolled into one) using a hand roller and laminated together. The films were not stretched during lamination process. All coated samples were placed in a vacuum laminating press to remove air bubbles between the film sheets. The PVDC coating thickness was approximately 0.0004 inch. A PVDC coated control was prepared in an identical manner but without hydroxypropyl βCD.

The data following the preparatory examples showing improvement in transmission rate was obtained using the following general test method.

METHOD SUMMARY

This method involves experimental techniques designed to measure the permeability of selected organic molecules through food packaging films, using a static concentration gradient. The test methodology simulates accelerated shelf-life testing conditions by implementing various storage humidities, product water activities and temperature conditions and using organic molecule concentrations found in previously tested food products to simulate outside-the-package organic vapors in the permeation test cell. This procedure allows for the determination of the following compounds: ethanol, toluene, p-xylene, o-xylene, 1,2,4-trimethyl benzene, naphthalene, naphtha solvent blend, etc.

| Test Compounds | Threshold Odor Conc. ul/L ppm | Environmental Cell Conc. ul/L ppm |
|---|---|---|
| Ethanol | 5–5000 | 20 |
| Toluene | 0.10–20 | 3 |
| p-Xylene | 0.5 | 2 |
| o-Xylene | 0.03–12 | 1 |
| 1,2,3-Trimethyl Benzene | NA | 0.5 |
| Naphthalene | 0.001–0.03 | 0.5 |

| Test Compounds | Threshold Odor Conc. ul/L ppm | Environmental Cell Conc. ul/L ppm |
|---|---|---|
| Naphtha Solvent Blend | NA | 40 |

Table 1. Permeant Test Compounds

In a typical permeation experiment, three steps are involved. They are (a) the instrument sensitivity calibration, (b) film testing to measure transmission and diffusion rates, and (c) the quality control of the permeation experiment.

Film samples are tested in a closed-volume permeation device. High-resolution gas chromatograph (HRGC) operated with a flame ionization detector (FID) is used to measure the change in the cumulative penetrant concentration as a function of time.

Sample-side and environment-side test compound concentrations are calculated from each compound's response factor or calibration curve. Concentrations are then volume-corrected for each specific set of permeation cells if permeant mass is desired.

The cumulative penetrant concentration is plotted as a function of time on both the upstream (environment) and downstream (sample) side of the film. The diffusion rate and transmission rate of the permeant are calculated from the permeation curve data.

1.0 Equipment and Reagents 2.1 Equipment

Gas chromatograph (HP 5880) equipped with flame ionization detector, a six-port heated sampling valve with 1 ml sampling loop and data integrator J&W capillary column. DB-5, 30M×0.250 mm ID, 1.0 umdf.

Glass permeation test cells or flasks. Two glass flasks with cavities of approximately 1200 ml (environment cell or feed side) and 300 ml (sample flask or permeating side) (FIG. 3).

Permeation cell clamping rings (2).

Permeation cell aluminum seal rings (2).

Natural Rubber Septa. 8 mm OD standard-wall or 9 mm OD (Aldrich Chemical Company, Milwaukee, Wis.).

Assorted laboratory glass ware and syringes.

Assorted laboratory supplies.

2.2 Reagents

Reagent water. Water in which interferences are not observed at the MDL of the chemical analytes of interest. A water purification system is used to generate reagent water which has been boiled to 80% volume, capped, and allowed to cool to room temperature before use.

Stock Ethanol/Aromatic Standard solution. Ethanol (0.6030 gram), toluene (0.1722 gram), p-xylene (0.1327 gram), o-xylene (0.0666 gram), trimethylbenzene (0.0375 gram) and naphthalene (0.0400 gram) package in 1 ml sealed glass ampules. Naphtha blends standard is a commercial paint solvent blend containing approximately twenty (20) individual aliphatic hydrocarbon compounds obtained from Sunnyside Corporation, Consumer Products Division, Wheeling, Ill.

Triton X-100. Nonylphenol nonionic surface active agent (Rohm and Hass).

2.0 Standards Preparation 2.2 Permeation Working Standard

A stock permeant test standard solution is used. These standards are prepared by weight from neat certified reference compounds, actual weight and weight percent are shown.

The working ethanol/aromatic standard is prepared by injecting 250 ul of the stock standard solution into 100 ml of reagent water containing 0.1 gram of surfactant (Triton X-100). It is important that the Triton X-100 is completely dissolved in the reagent water prior to adding the permeant stock standard. This will insure dispersing the test compounds in the water. In addition, the working standard should be mixed thoroughly each time an aliquot is dispensed. It is advisable to transfer the working standard to crimp-top vials with no headspace to minimize losses due to the large headspace in the volumetric flask used to prepare the standard. A working naphtha blend standard is prepared by injecting 800 µL of the "neat" naphtha solvent blend into 100 milliliters of reagent water containing 0.2 gram of surfactant (Triton X-100).

An opened stock standard solution should be transferred from the glass snap-cap vial to a crimp-top vial for short-term storage. The vials may be stored in an explosion-proof refrigerator or freezer.

2.1 Calibration Standards

Calibration standards are prepared at a minimum of three concentration levels by adding volumes of the working standard to a volumetric flask and diluting to volume with reagent water. One of the standards is prepared at a concentration near, but above, the method detection limit. The other concentrations correspond to the expected range of concentrations found in the environment and sample side cells.

3.0 Sample Preparation 3.1 Film Sample Preparation

The environment flask FIG. 3 and sample flask are washed before use in soapy water, thoroughly rinsed with deionized water, and oven-dried. Following cleaning, each flask is fitted with a rubber septum.

The film test specimen is cut to the inside diameter of the aluminum seal ring using a template. The film test specimen diameter is important to prevent diffusion losses along the cut edge circumference. The film sample, aluminum seals, and flasks are assembled as shown in FIG. 3, but the clamping ring nuts are not tightened.

The test cell (FIG. 3) is prepared. First the sample flask 32 and environment flask 31 are flushed with dry compressed air to remove humidity in the sample and environment flasks. This is done by puncturing the sample system 33 and environment septum 34 with a needle and tubing assembly which permits a controlled flow of dry air through both flasks simultaneously. The clamp rings 35 are loosely fitted to the flasks to eliminate pressure buildup on either side of the film 30. After flushing both flasks for approximately 10 minutes, the needles are removed and the clamp rings tightened, sealing the film 30 between the two flasks. Rubber faced aluminum spacers 36a, 36b are used to ensure a gas tight fit.

The sample side is injected with 2 µL of water per 300 ml flask volume. Since the sample flasks vary in volume, the water is varied to correspond to the volume variations. The 2 µL of water in the 300 ml flask volume is comparable to a 0.25 water activity product at 72° F. Next, 40 µL, the permeation ethanol/aromatic working standard or 40 µL of the naphtha blend working standard prepared according to section 2.2, is injected into the environmental flask. Either of these working standards will produce a 60% relative humidity at 72° F. with a permeant concentration (parts per million-volume/volume) in the 1200 ml volume flask indicated in Table I. Other humidities or permeant concentrations may be employed in the test method by using psychrometric chart to determine humidity and using the gas loss to calculate permeant concentration. The time is recorded and the permeation cell placed into a thermostatically controlled oven. Samples may be staggered to accommodate GC run time. Three identical permeation devices are prepared. Triplicate analyses are used for QC purposes.

At the end of each time interval, a sample from the group is removed from the oven. The environmental flask is analyzed first, using a heated six-port sampling valve fitted with a 1 ml loop. The loop is flushed with a 1 ml volume of the environment-side or sample-side air. The loop is injected onto the capillary column. The GC/FID system is started manually following the injection. Up to eight 1 ml sample injections may be taken from the sample and environment side of a single permeation experiment.

Sample side and environment side test compound concentrations are calculated from each compound's calibration curve or response factor (equation 1 or 3). Concentrations are then volume-corrected for each specific set of permeation flasks if permeant mass is desired.

4.0 Sample Analysis 4.1 Instrument Parameters

Standards and samples are analyzed by gas chromatography using the following method parameters:

Column: J&W column, DB-5, 30 M, 0.25 mm ID, 1 umdf
Carrier: Hydrogen
Split Vent: 9.4 ml/min
Injection Port Temp: 105° C.
Flame Detector Temp: 200° C.
Oven Temp 1: 75° C.
Program Rate 1: 15° C.
Oven Temp 2: 125° C.
Rate 2: 20° C.
Final Oven Temp: 200° C.
Final Hold Time: 2 Min The six-port sampling valve temperature is set to 105° C..

4.2 Calibration

A three point calibration is prepared using standards in the range of the following test compounds:

| Test Compounds | Calibration Curve Range ppm (µL) |
|---|---|
| Ethanol | 2–20 |
| Toluene | 0.3–3 |
| p-Xylene | 0.2–2 |
| o-Xylene | 0.1–1 |
| 1,2,4-Trimethyl Benzene | 0.05–0.5 |
| Naphthalene | 0.05–0.5 |
| Naphtha Solvent Blend | 4.0–40 |

To prepare a calibration standard, add an appropriate volume of the working standard solution to an aliquot of reagent water in a volumetric flask.

4.2.1 Secondary Dilutions of Working Standard for Calibration Curve 5 to 1 dilution: Place 5 ml of working standard into a 25-ml volumetric flask, stopper, then mix by inverting flask.

2.5 to 1 dilution: Place 10 ml of working standard into a 25-ml volumetric flask, stopper, then mix by inverting flask.

Analyze each calibration standard and tabulate compound peak area response versus the concentration of the test compound in the environment side cell. The results are used to prepare a calibration curve for each compound. The naphtha solvent blend is a commercial paint solvent containing approximately twenty (20) individual aliphatic hydrocarbon compounds. The response versus concentration is determined by totaling the area under each of the twenty individual peaks. Method of least squares is used to fit a straight line to the calibration curve. The slope of each test compound's calibration curve is then calculated for determining the unknown concentration. The average response factor may be used in place of the calibration curve.

The working calibration curve or response factor must be verified on each working day by measurement of one or more calibration standards. If the response of any compound varies more than 20%, the test must be repeated using a fresh calibration standard. If the results still do not agree, generate a new calibration curve.

4.3 Analysis of Calibration Curve and Method Detection Level Samples

Recommended chromatographic conditions are summarized above.

Calibrate the system daily as described above.

Check and adjust split vent rate and check rate with soap film flow meter.

To generate accurate data, samples, calibration standards and method detection level samples must be analyzed under identical conditions.

Calibration standards and method detection samples are prepared in the environment flask only. This is accomplished by using a ½ inch plastic disk and aluminum sheet disk the diameter of the environment flange in place of the sample flask. A single sealing ring is placed onto the environmental glass flange followed by an aluminum sheet, and then the plastic disk.

The environment flask is flushed with dry compressed air to remove humidity in the sample and environment flask. This is done by puncturing the environment septa with a needle and tubing assembly which permits a controlled flow of dry air through the flask. The clamp rings are loosely fitted to the flask to eliminate pressure buildup. After flushing both flasks for approximately 10 minutes, the needle is removed and the clamp rings tightened, sealing the aluminum sheet against the seal ring.

Next, 40 µl of the permeation ethanol/aromatic working standard or secondary dilutions of the working standard is injected into the environment flask. Alternatively, 40 µL of the naphtha solvent blend or secondary dilutions of the working standard is injected into the environmental flask. The time is recorded and the flask is placed into a thermostatically controlled oven.

At the end of 30 minutes, the environment flask is removed from the oven. The environmental flask is analyzed using a heated six-port sampling valve fitted with a 1 ml loop. The loop is flushed with a 1 ml volume of the environment-side or sample-side air. The loop is injected onto the capillary column. The GC/FID system is started manually following the injection.

4.4 Calculation of Results 4.4.1 Test Compound Response Factor

Sample-side and environment-side test compound concentrations are calculated for each compound's calibration curve slope or response factor (RF). Concentrations are then volume-corrected for each specific set of permeation cells if permeant mass is desired.

$$\text{Concentration of Compound in ppm} = \frac{\text{Peak Area}}{\text{Calibration Curve Slope}} \quad (1)$$

-continued $$\text{Compound Specific } RF = \frac{\text{Concentration of Compound in ppm}}{\text{Peak Area}} \quad (2)$$

$$\text{Concentration of Compound in ppm} = \text{Peak Area} \times RF \quad (3)$$

The cumulative penetrant mass is plotted as a function of time on both the upstream (environment) and downstream (sample) side of the film. The diffusion rate and transmission rate of the permeant area calculated from the transmission curve data.

4.4.2 Transmission Rate

When a permeant does not interact with the polymer, the permeability coefficient, R, is usually characteristic for the permeant-polymer system. This is the case with the permeation of many gases, such as hydrogen, nitrogen, oxygen, and carbon dioxide, through many polymers. If a permeant interacts with polymer molecules, as is the case with the permeant test compounds used in this method, P is no longer constant and may depend on the pressure, film thickness, and other conditions. In such cases, a single value of P does not represent the characteristic permeability of the polymer membrane and it is necessary to know the dependency of P on all possible variables in order to obtain the complete profile of the permeability of the polymer. In these cases, the transmission rate, Q, is often used for practical purposes, when the saturated vapor pressure of the permeant at a specified temperature is applied across the film. Permeability of films to water and organic compounds is often expressed this way.

$$P = \frac{(\text{Amount of Permeant})(\text{Film Thickness})}{(\text{Area})(\text{Time})(\text{Pressure-drop Across the Film})} \quad (4)$$

$$Q = \frac{(\text{Amount of Permeant})(\text{Film Thickness})}{(\text{Area})(\text{Time})} \quad (5)$$

In this application, Q is represented in units of $$\frac{\text{gm-0.001 inches}}{100 \text{ in}^2\text{-day}}.$$

One of the major variables in determining the permeation coefficient is the pressure drop across the film. Since the transmission rate Q includes neither pressure nor concentration of the permeant in its dimensions, it is necessary to know either vapor pressure or the concentration of permeant under the conditions of the measurement in order to correlate Q to P.

The pressure-drop across the film from environment side to sample side is principally due to water vapor pressure. The water concentration or humidity does not remain constant and is not measured during the time intervals the organic compounds are analyzed, and therefore the pressure across the membrane is not determined.

The above examples of thermoplastic films containing a variety of compatible cyclodextrin derivatives shows that the invention can be embodied in a variety of different thermoplastic films. Further, a variety of different compatible derivatized cyclodextrin materials can be used in the invention. Lastly, the films can be manufactured using a variety of film manufacturing techniques including extrusion and aqueous dispersion coating to produce useful barriers.

The above specification, examples of substituted cyclodextrin, extruded thermoplastic films and test data provide a basis for understanding the technical aspects of the invention. Since the invention can be made with a variety of embodiments, the invention resides in the claims hereinafter appended.

We claim:

1. A thermoplastic film, having improved barrier properties, the film consisting essentially of:
   (a) a thermoplastic polymer film; and
   (b) uniformly dispersed in the film, an effective permeant absorbing amount of a modified cyclodextrin having pendent moieties or substituents that render the cyclodextrin compatible with the thermoplastic polymer;
   wherein the cyclodextrin is free of an inclusion complex compound and cooperates with the thermoplastic polymer to provide barrier properties.

2. The film of claim 1 wherein the thermoplastic polymer comprises a vinyl polymer comprising an alpha-olefin.

3. The film of claim 1 wherein the thermoplastic polymer comprises a chlorine containing vinyl polymer comprising vinyl chloride or vinylidene chloride.

4. The film of claim 3 wherein the thermoplastic polymer comprises a poly(vinyl chloride-co-vinyl acetate) or a poly(vinyl chloride-co-vinylidene chloride).

5. A film of claim 1 wherein the thermoplastic polymer comprises a polyvinylalcohol, a poly(ethylene-co-vinyl alcohol), a poly(ethylene-co-acrylic acid) or a poly (ethylene-co-methyl acrylate).

6. The film of claim 1 wherein the modified cyclodextrin contains at least one substituent on a cyclodextrin primary carbon atom.

7. The film of claim 1 wherein the modified cyclodextrin comprises a modified α-cyclodextrin, a modified β-cyclodextrin, a modified γ-cyclodextrin having pendent moieties or substituents that render the modified α-cyclodextrin, modified β-cyclodextrin or modified γ-cyclodextrin compatible with the thermoplastic polymer or mixtures thereof.

8. The film of claim 1 wherein the thermoplastic web contains about 0.1 to 5 wt-% of the polymer compatible modified cyclodextrin.

9. A thermoplastic film, having improved barrier properties, the film consisting essentially of:
   (a) a thermoplastic polyethylene having a melt index of 0.1 to 4 and an $M_w$ greater than 200,000; and
   (b) uniformly dispersed in the film, about 0.1 to 5 wt-% of a permeant absorbing amount of a modified cyclodextrin having pendent moieties or substituents that render the cyclodextrin compatible with the thermoplastic polyethylene;
   wherein the cyclodextrin is free of an inclusion complex compound and cooperates with the thermoplastic polymer to provide barrier properties.

10. The composition of claim 9 wherein the thermoplastic polyethylene comprises a linear polyethylene.

11. The composition of claim 10 wherein the thermoplastic polyethylene comprises a linear low density polyethylene.

12. The composition of claim 11 wherein the polyethylene has a melt index of about 0.2 to 3.

13. The composition of claim 9 wherein the modified cyclodextrin comprises an acetyl derivative of the cyclodextrin.

14. The composition of claim 9 wherein the modified cyclodextrin comprises a trimethylsilyl derivative of the cyclodextrin.

15. The composition of claim 9 wherein the pendent moieties or substituents are formed on at least one primary carbon of the cyclodextrin.

16. The composition of claim 9 wherein the modified cyclodextrin comprises a modified α-cyclodextrin, a modified β-cyclodextrin, a modified γ-cyclodextrin having pendent moieties or substituents that render the modified α-cyclodextrin, modified β-cyclodextrin or modified γ-cyclodextrin, or mixtures thereof, compatible with the thermoplastic polymer.

17. The composition of claim 9 wherein the modified cyclodextrin is present at a concentration of about 0.1 to 2 wt-%.

18. A thermoplastic film, having improved barrier properties, the film consisting essentially of:
   (a) a thermoplastic polymer comprising a chlorine containing vinyl polymer; and
   (b) uniformly dispersed in the film, permeant absorbing amount of a modified cyclodextrin having pendent moieties or substituents that render the cyclodextrin compatible with the thermoplastic polymer;
wherein the cyclodextrin is free of an inclusion complex compound and cooperates with the thermoplastic polymer to provide barrier properties.

19. The film composition of claim 17 wherein the thermoplastic web comprises a polyvinyl chloride homopolymer.

20. The film composition of claim 18 wherein the thermoplastic web comprises a polyvinylidene chloride homopolymer.

21. The film composition of claim 18 wherein the thermoplastic web comprises a poly(vinyl chloride-co-vinylidene chloride) polymer.

22. The film composition of claim 17 wherein the thermoplastic web comprises a poly(vinyl chloride-co-vinyl acetate).

23. The film composition of claim 18 wherein the modified cyclodextrin comprises an acetylated cyclodextrin.

24. The film composition of claim 18 wherein the modified cyclodextrin comprises a trimethylsilyl derivative of cyclodextrin.

25. The film composition of claim 17 wherein the modified cyclodextrin comprises a modified α-cyclodextrin, a modified β-cyclodextrin, a modified γ-cyclodextrin having pendent moieties or substituents that render the modified α-cyclodextrin, modified β-cyclodextrin or modified γ-cyclodextrin or mixtures thereof compatible with the thermoplastic polymer.

26. The composition of claim 18 wherein the modified cyclodextrin is present in the thermoplastic web at a concentration of about 0.1 to 2 wt-%.

27. A thermoplastic barrier film, having improved barrier properties, the film consisting essentially of:
   (a) a web comprising a thermoplastic polypropylene film having a melt index of 0.1 to 4 and an $M_w$ greater than 200,000; and
   (b) uniformly dispersed in the film, an about 0.1 to 5 wt-% of a permeant absorbing amount of a modified cyclodextrin having pendent moieties or substituents that render the cyclodextrin compatible with the thermoplastic polymer;
wherein the cyclodextrin is free of an inclusion complex compound and cooperates with the thermoplastic polymer to provide barrier properties.

28. The composition of claim 27 wherein the polymer $M_w$ is greater than 250,000.

29. The composition of claim 26 wherein the polypropylene has a melt index of about 0.2 to 3.

30. The composition of claim 27 wherein the modified cyclodextrin comprises an acetyl derivative of the cyclodextrin.

31. The composition of claim 27 wherein the modified cyclodextrin comprises a trimethylsilyl derivative of the cyclodextrin.

32. The composition of claim 27 wherein the pendent moieties or substituents are formed on at least one primary carbon of the cyclodextrin.

33. The composition of claim 26 wherein the modified cyclodextrin comprises a modified α-cyclodextrin, a modified β-cyclodextrin, a modified γ-cyclodextrin having pendent moieties or substituents that render the modified α-cyclodextrin, modified β-cyclodextrin or modified γ-cyclodextrin or mixtures thereof compatible with the thermoplastic polymer.

34. The composition of claim 27 wherein the modified cyclodextrin is present at a concentration of about 0.1 to 2 wt-%.

35. The composition of claim 26 wherein the thermoplastic polypropylene comprises a web.

* * * * *

UNITED STATES PATENT AND TRADEMARK OFFICE
CERTIFICATE OF CORRECTION

PATENT NO. : 5,492,947
DATED : February 20, 1996
INVENTOR(S) : Willard E. Wood and Neil J. Beaverson It is certified that error appears in the above-indentified patent and that said Letters Patent is hereby corrected as shown below:

In Column 3, line 50, "DISSCUSSION" should read --DISCUSSION--.

In Column 20, TABLE 1B, Roll No. 17 entry, after the last word "Very", insert --slight yellowing to film--.

In Column 30, line 13, "A" starts a new paragraph.

In Column 35, lines 39 and 40, after the word "thereof", delete "compatible with the thermoplastic polymer".

In Column 36, line 3, "web" should read --film--.

In Column 36, line 4, "an" should read --a--.

In Column 36, line 6, "an" should read --and--.

In Column 36, lines 36 and 37, after the word "thereof", delete "compatible with the thermoplastic polymer".

Signed and Sealed this

Sixth Day of August, 1996

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO.         : 5,492,947
APPLICATION NO.    : 08/264771
DATED              : February 20, 1996
INVENTOR(S)        : Willard E. Wood and Neil J. Beaverson It is certified that error appears in the above-identified patent and that said Letters Patent is hereby corrected as shown below:

At Col. 35, line 17, claim 19: "claim 17 wherein" should read --claim 18 wherein--.

At Col. 35, line 17, claim 22: "claim 17 wherein" should read --claim 18 wherein--.

At Col. 35, line 17, claim 34: "claim 17 wherein" should read --claim 18 wherein--.

At Col. 36, line 18, claim 29: "claim 26 wherein" should read --claim 27 wherein--.

At Col. 36, line 30, claim 33: "claim 26 wherein" should read --claim 27 wherein--.

At Col. 36, line 40, claim 35: "claim 26 wherein" should read --claim 27 wherein--.

Signed and Sealed this

Twenty-fourth Day of November, 2009

David J. Kappos
*Director of the United States Patent and Trademark Office*